United States Patent [19]
Kane et al.

[11] Patent Number: 5,621,850
[45] Date of Patent: Apr. 15, 1997

[54] SPEECH SIGNAL PROCESSING APPARATUS FOR CUTTING OUT A SPEECH SIGNAL FROM A NOISY SPEECH SIGNAL

[75] Inventors: Joji Kane, Nara; Akira Nohara, Nishinomiya, both of Japan

[73] Assignee: Matsushita Electric Industrial Co., Ltd., Osaka, Japan

[21] Appl. No.: 361,152

[22] Filed: Dec. 21, 1994

Related U.S. Application Data

[63] Continuation of Ser. No. 101,825, Aug. 4, 1993, abandoned, which is a continuation of Ser. No. 706,576, May 28, 1991, abandoned.

[30] Foreign Application Priority Data

| May 28, 1990 | [JP] | Japan | 2-138053 |
| May 28, 1990 | [JP] | Japan | 2-138061 |
| May 28, 1990 | [JP] | Japan | 2-138062 |
| May 28, 1990 | [JP] | Japan | 2-138063 |
| May 28, 1990 | [JP] | Japan | 2-138067 |

[51] Int. Cl.$^6$ .................. G10L 3/02; G10L 9/00
[52] U.S. Cl. .................. 395/2.15; 395/2.42
[58] Field of Search .................. 395/2, 2.14, 2.16, 395/2.15, 2.35, 2.42; 381/36–47

[56] References Cited

U.S. PATENT DOCUMENTS

| 4,827,516 | 5/1989 | Tsukahara et al. | 381/36 |
| 4,837,830 | 6/1989 | Wrench, Jr. et al. | 395/2.55 |
| 4,839,844 | 6/1989 | Watari | 364/727 |
| 4,852,181 | 7/1989 | Morito et al. | 395/2 |
| 4,905,286 | 2/1990 | Sedgwick et al. | 395/2 |
| 4,989,249 | 1/1991 | Oka et al. | 381/43 |
| 5,036,539 | 7/1991 | Wrench, Jr. et al. | 395/2.55 |

FOREIGN PATENT DOCUMENTS

| 0438174A3 | 7/1991 | European Pat. Off. | G10L 3/00 |
| 2104218 | 3/1983 | United Kingdom | G01S 3/86 |
| WO87/00366 | 1/1987 | WIPO | H03G 3/34 |
| WO87/04294 | 7/1987 | WIPO | G10L 5/00 |

OTHER PUBLICATIONS

"Cepstral Analysis Technique For Automatic Speaker Verification", Furui, IEEE transactions On Acoustics, Speech And Signal Processing., vol. 29, No. 2, Apr. 1981, New York, US, pp. 254–272.

"Seperation Of Simultaneous Voices", Stubs, Summerfield, Eurospeech 87, European Conference On Speech Technology, vol. 1, Sep. 1987, Edinburgh Scotland, pp. 199–202.

"Word Recognition System With Automatic Selection Of Word Library", Clapper, IBM Technical Disclosure Bulletin, vol. 13, No. 3, Aug. 1970, New York US, p. 731.

"System For Automatic Formant Analysis Of Voiced Speech", Schafer, Rabiner, Journal of the Acoustical Society of America, vol. 47, No. 2, Feb. 1970, New York US, pp. 634–648.

"Speech Enhancement", LIM, International Conference on Acoustics Speech and Signal Processing, vol. 4, 7 Apr. 1986, Tokyo Japan, pp. 3135–3142.

"Cepstrum Pitch Determination", Noll, Bell Telephone Laboratories, Murray Hill, NJ, Aug. 1966, pp. 293–309, The Journal of Acoustical Society of America.

(List continued on next page.)

Primary Examiner—Allen R. MacDonald
Assistant Examiner—Richemond Dorvil
Attorney, Agent, or Firm—Wenderroth, Lind & Ponack

[57] ABSTRACT

A band division process including a Fourier transformation is performed for an inputted speech signal, thereby outputting spectrum signals of plural channels. A cepstrum analysis process is performed for the spectrum signals, and a peak of the obtained cepstrum is detected in response to the cepstrum analysis result. Thereafter, a speech signal interval of the inputted noisy speech signal is detected in response to the detected peak, and a noise is predicted in the speech signal in response to the detected speech signal interval. Then, the predicted noise is canceled in the spectrum signals thereby outputting noise-suppressed spectrum signals. Finally, the noise-suppressed spectrum signals are combined and are inverse Fourier-transformed, thereby outputting a noise-suppressed speech signal.

2 Claims, 19 Drawing Sheets

OTHER PUBLICATIONS

"Umgebungsgerauschreduktion bei Sprachkommunkiationssystemen", Koschel, 2213 Frequenz, Feb.–Mar. 1988, berlin, West Germany, pp. 79–84.

"Techniques for Suppression of an Interfering Talker in Co–Channel Speech", Naylor et al., ITT Defense Communications Division, 1987 IEEE, pp. 205–208.

"Acoustic Noise Analysis and Speech Enhancement Techniques for Mobile Radio Applications", Dal Degan et al., Signal Processing 15 (1988), pp. 43–56.

Lapedes, "Dictionary of Physics and Mathematics", McGraw–Hill, 1978, p. 143.

Rabiner et al., "Digital Processing of Speech Signals," Prentice–Hall, Inc., New Jersey, 1978 by Bell Labratories, Inc., pp. 372–377.

Chen, "Cepstral Talker Stress Compensation for Robust Speech Recognition", IEEE Trans. on ASSP, vol. 36, No. 4, Apr. 1988, pp. 433–439.

Kabayashi et al., "Use of Generalized Cepstral Distance Measure in Isolated Word Recognition", Electronics and Communications in Japan, Part 3, vol. 72, No. 7, Jul. 1989, pp. 1–8.

Input signal

Predicted noise signal

Output signal

Fig. 7(a) Input signal
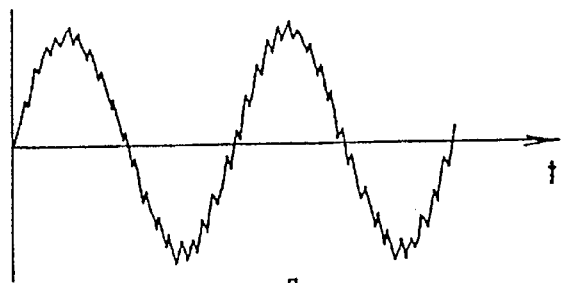
↓ Fourier transformation
Fig. 7(b) Spectrum of input signal
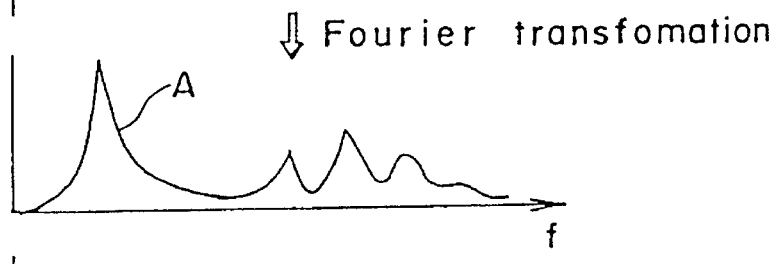
Fig. 7(c) Spectrum of Predicted noise
Fig. 7(d) Spectrum of output signal
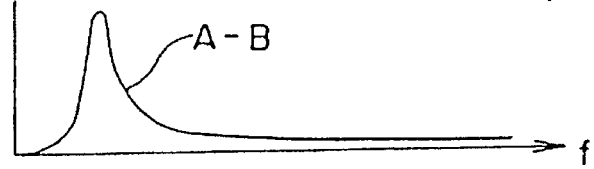
↓ Inverse Fourier transformation
Fig. 7(e) Output signal
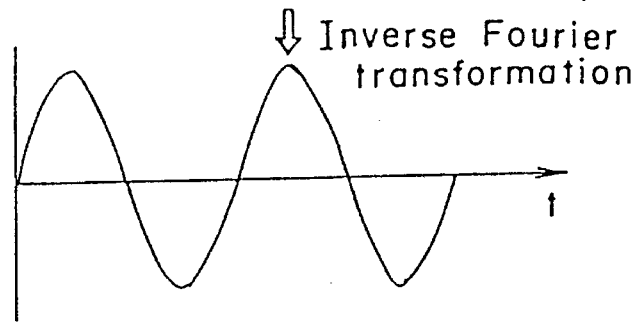

SPEECH SIGNAL PROCESSING APPARATUS FOR CUTTING OUT A SPEECH SIGNAL FROM A NOISY SPEECH SIGNAL

This application is a Continuation of now abandoned application Ser. No. 08/101,825, filed Aug. 4, 1993, now abandoned which is a Continuation of abandoned application Ser. No. 07/706,576, filed May 28, 1991.

BACKGROUND OF THE INVENTION

1. Field of the Invention

The present invention relates to a speech signal processing apparatus, and more particularly, to a signal detection apparatus for detecting a noise-suppressed speech signal from a noisy speech signal and detecting a kind of the detected speech signal, a signal processing apparatus for discriminating between speeches of plural speakers prior to speech recognition, and a speech recognition apparatus for recognizing a speech spoken by a speaker.

2. Description of the Prior Art

Conventionally, there has been suggested an apparatus for discriminating between a speech and a noise in response to a noisy speech signal (See, for example, the Japanese patent laid open publication (JP-A) No. 59-124397/1984, and the Japanese patent laid open publication (JP-A) No. 59-131997/1984). The discrimination result outputted from the apparatus is used in an apparatus for recognizing a speech such as a speech recognition apparatus. However, the conventional apparatuses for discriminating between a noise and a speech can not detect a kind of the speech, namely, can not detect who speaks. In a general speech recognition apparatus, it is desired that a kind of the speech is previously detected.

Further, conventionally, in a conventional speech recognition apparatus, a word spoken by a speaker is often recognized by inputting a speech signal of a particular speaker thereto. Namely, in order to heighten a recognition rate upon pattern-matching of speech features, information as to who now speaks is inputted to the speech recognition apparatus. Alternatively, in a speech recognition apparatus provided in a system for keeping information confidential, it is desired that only a particular speech is accepted. Namely, it is desired to judge who speaks and to use information of the judgment result prior to speech recognition.

Further, recently, there has been developed a system which can be used only if a particular word is spoken in secured areas such as a laboratory. In this system, by utilizing a speech recognition technique, when a key word is spoken toward this system using key words such as "one", "three", "five", "seven", this system is enabled. In the system of this type, it is necessary not only to use the above-mentioned key word but also to limit the speaker to a particular one. Namely, it is desired that the system is constituted so that the system is enabled only when a predetermined particular speaker speaks a key word toward the system.

SUMMARY OF THE INVENTION

The object of the present invention is therefore to provide a signal detection apparatus capable of detecting a noise-suppressed speech signal from a noisy speech signal.

Another object of the present invention is to provide a signal detection apparatus capable of detecting a speech and a kind of the speech in response to a speech signal.

A further object of the present invention is to provide a signal processing apparatus capable of discriminating between speeches of plural speakers and outputting respective discriminated speech signals.

A still further object of the present invention is to provide a speech recognition apparatus capable of recognizing only a speech of a predetermined particular speaker and outputting a speech signal thereof.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIGS. 6(a)–6(c) and 7(a)–7(c) are diagrams showing waveforms for explaining a noise cancellation method used in the preferred embodiments;

DETAILED DESCRIPTION OF THE PREFERRED EMBODIMENTS

The preferred embodiments according to the present invention will be described below in detail with reference to the attached drawings.

The First Preferred Embodiment

Figure 1:
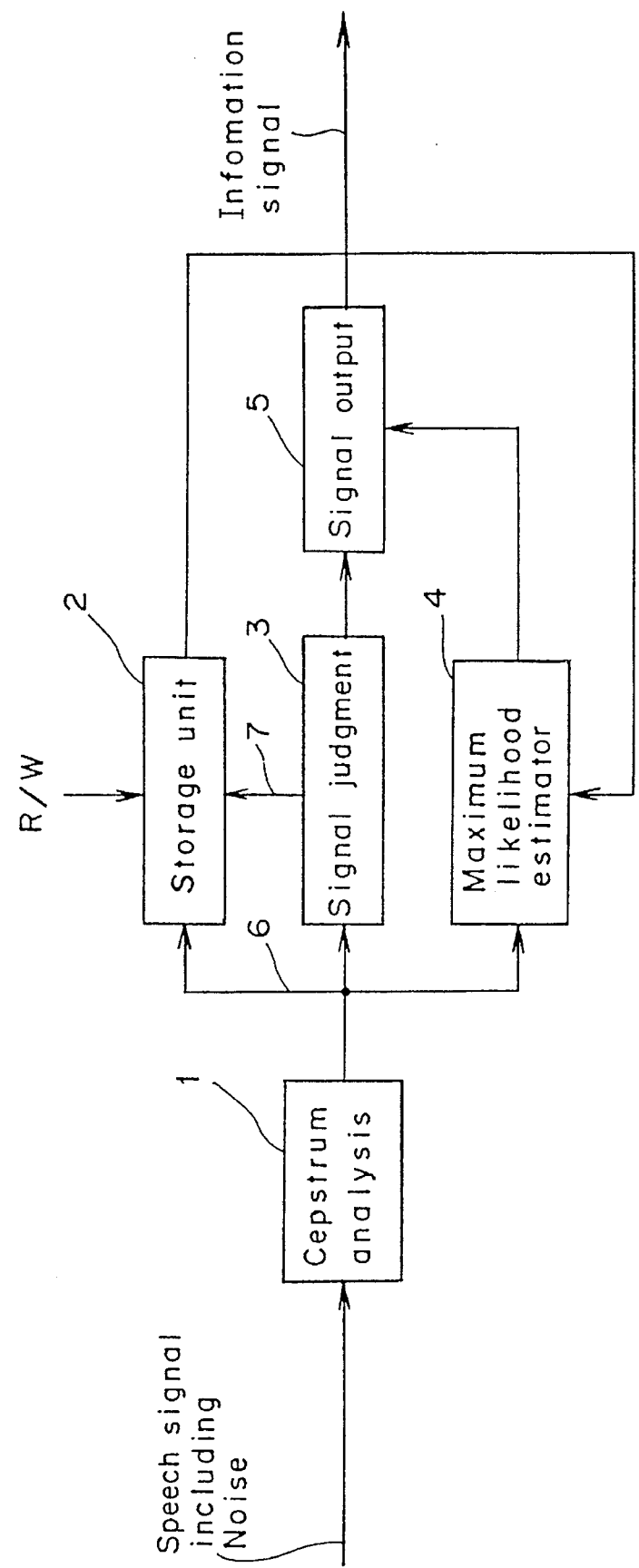
FIG. 1 is a schematic block diagram showing a signal detection apparatus of a first preferred embodiment according to the present invention.

FIG. 1 shows a signal detection apparatus of a 10 first preferred embodiment according to the present invention. In the present preferred embodiment, there is described as one example the use of a speech signal as a signal to be processed.

Referring to FIG. 1, the signal detection apparatus comprises a cepstrum analysis section 1, a storage unit 2, a signal judgment section 3, a maximum likelihood estimator 4 and a signal output section 5.

Figure 4A:
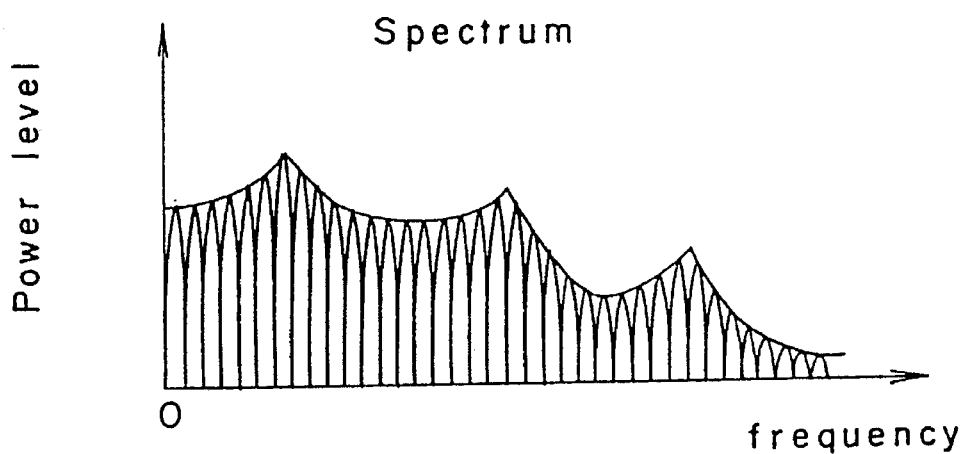
FIGS. 4a and 4b are graphs showing a cepstrum analysis used in the preferred embodiments.
Figure 4B:
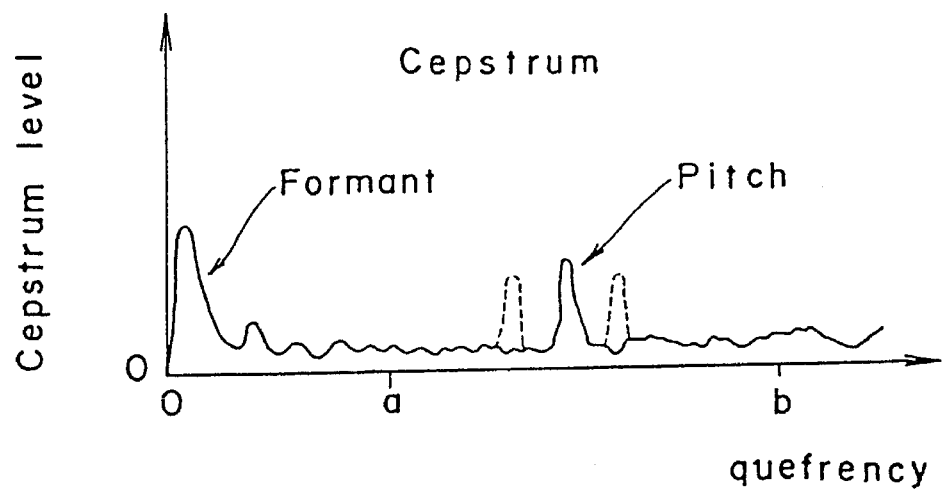

The cepstrum analysis section 1 performs a cepstrum analysis for an inputted speech signal which is previously Fourier-transformed by a band division section. A cepstrum is obtained by calculating a logarithm of an amplitude spectrum for a short time interval of a waveform of the inputted speech signal and inverse-Fourier-transforming the calculated logarithm. FIG. 4a shows an amplitude spectrum for a short time interval of a speech signal, and FIG. 4b shows a cepstrum of the speech signal.

The storage unit 2 is provided for previously storing predetermined feature information of known kinds of plural speech signals, and is constituted by a RAM or ROM. Namely, for example, the storage unit 2 stores information of a relationship between a cepstrum analysis result of a speech signal of a speaker A and the speaker A. The cepstrum analysis result includes at least a presence position of a peak or a pitch of the obtained cepstrum and formant information, as shown in FIG. 4b. Similarly, the cepstrum analysis result of speeches of the other speakers B, C and so on is previously stored in the storage unit 2. The presence positions of peaks or pitches and the formant information of respective speakers are different from each other for every speaker. It is to be noted that, as feature information of a speech, there may be used any speech feature such as an amplitude and a phase of a speech and so on in addition to the above-mentioned cepstrum analysis result.

Figure 2:
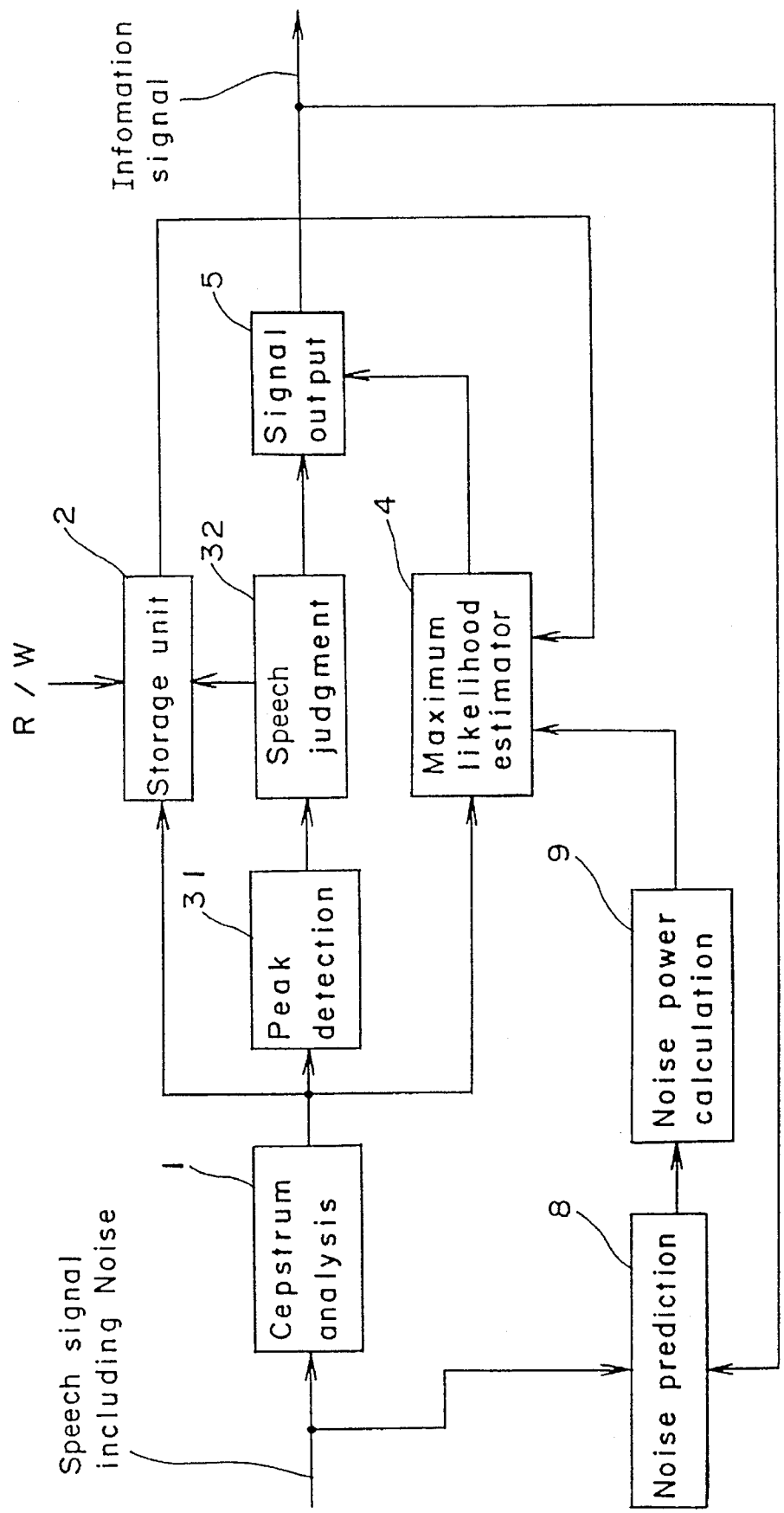
FIG. 2 is a schematic block diagram showing a signal detection apparatus of a second preferred embodiment according to the present invention.

The signal judgment section 3 discriminates between a speech and a noise in response to a noisy speech signal by utilizing a cepstrum obtained by the cepstrum analysis section 1. As a method for detecting a speech signal interval by utilizing the cepstrum of the speak signal, there has been known to those skilled in the art, for example, a method for discriminating between a speech signal and a noise by detecting a peak or a pitch of the cepstrum. Namely, as shown in FIG. 2, the signal judgment section 3 comprises a peak detection section 31 for detecting a peak of the obtained cepstrum, and a speech judgment section 32 for detecting a speech signal interval based on the detected peak information. The pitch shown in FIG. 4b represents a peak of the speech signal, and a time interval when the peak exits in the cepstrum is a speech signal interval. The peak is detected by, for example, presetting a predetermined threshold value for a cepstrum and comparing respective power levels of the cepstrum with the preset threshold value.

At a timing when a speech signal interval is detected by the signal judgment section 3, a control signal is outputted from the signal judgment section 3 to the storage unit 2, and then, feature information previously stored in the storage unit 2 is inputted to the maximum likelihood estimator 4. On the other hand, the feature information of the cepstrum analysis result of the speech is inputted from the cepstrum analysis section 1 to the maximum likelihood estimator 4. The maximum likelihood estimator 4 compares the inputted cepstrum analysis result with the feature information outputted from the storage unit 2, sequentially, switching the feature information in an order of the feature information of the speakers A, B, C, D and so on, searching the feature information which is the most like the inputted cepstrum analysis result, and detecting which speaker corresponds to the inputted speech. As a method for detecting the degree of the similarity therebetween, there can be used a pattern matching method, a method for detecting a degree of the similarity between amplitudes thereof, and a method for detecting a degree of the similarity between phases thereof, which are well known to those skilled in the art.

The signal output section 5 outputs a pair of the detection results in response to the detection result outputted from the signal judgment section 3 and the detection result outputted from the maximum likelihood estimator 4. Namely, the signal output section 5 outputs not only presence information of the speech or information of the speech signal interval but also information of the speaker of the speech signal.

An operation of the signal detection apparatus of the present preferred embodiment will be described below.

First of all, cepstrum analysis results of speeches of respective speakers are previously stored in the storage unit 2. Thereafter, a noisy speech signal is inputted to the cepstrum analysis section 1, and then, the cepstrum analysis section 1 performs the cepstrum analysis for the inputted noisy speech signal as described above. It is to be noted that the cepstrum analysis of speeches of respective speakers may be performed by the cepstrum analysis section 1 as indicated by a reference 6.

The signal judgment section 3 detects a speech signal interval of the inputted noisy speech signal utilizing the peak etc. of the cepstrum analysis result outputted from the cepstrum analysis section 1. Then, at a timing when a speech signal interval is detected by the signal judgment section 3, a control signal is outputted from the signal judgment section 3 to the storage unit 2 as indicated by a reference 7, and then, the cepstrum analysis result stored in the storage unit 2 is outputted to the maximum likelihood estimator 4. On the other hand, the cepstrum analysis result is inputted from the cepstrum analysis section 1 to the maximum likelihood estimator 4. The maximum likelihood estimator 4 compares the cepstrum analysis result inputted from the cepstrum analysis section 1 with the cepstrum analysis results inputted from the storage unit 2, and determines one of the cepstrum analysis results stored in the storage unit 2 which is the most like the cepstrum analysis result outputted from the cepstrum analysis section 1. If there is not any one of the cepstrum analysis results which is like the cepstrum analysis result outputted from the cepstrum analysis section 1 with a similarity larger than a threshold value, the maximum analysis result which is like the cepstrum analysis result of likelihood estimator 4 judges that there is no cepstrum the inputted speech signal. Finally, the signal output section 5 outputs a pair of the detection result outputted from the maximum likelihood estimator 4 and the detection result outputted from the signal judgment section 3.

In the present preferred embodiment, as an input signal, there is used a speech signal, however, the present invention is not limited to this. Instead of the speech signal, there may be used a signal of a sound of an automobile or a signal of a sound of an airplane etc., and then, the other signals are judged as noise. In this case, the cepstrum analysis result is not used, and the other feature information thereof is used.

The Second Preferred Embodiment

FIG. 2 shows a signal detection apparatus of a second preferred embodiment according to the present invention. In FIG. 2, the same components as those shown in FIG. 1 are denoted by the same references as those shown in FIG. 1.

As shown in FIG. 2, in a manner similar to that of the first preferred embodiment shown in FIG. 1, the signal judgment section 3 comprises the peak detection section 31 and the speech judgment section 32. However, the signal judgment apparatus further comprises a noise prediction section 8 and a noise power calculation section 9 in addition to the respective sections of the first preferred embodiment. Differences between the first and second preferred embodiments will be described below in detail.

The maximum likelihood estimator 4 detects a kind of a speech which is the most like that of an inputted speech signal taking into consideration a predicted noise in the speech in addition to the cepstrum analysis results outputted from the storage unit 2 and the cepstrum analysis result outputted from the cepstrum analysis section 1. Namely, when the speech judgment section 32 detects a timing of generation of a speech, the detection result is outputted from the speech judgment section 32 to the noise prediction section 8. On the other hand, a noisy speech signal is inputted to the noise prediction section 8. Since a portion where there is no speech is a portion where there is only noise (referred to as a noise alone portion hereinafter), the noise prediction section 8 predicts a noise of a speech based on data of the noise alone portion. Namely, the noise prediction section 8, for example, predicts a noise component by respective channels based on the noisy speech signal which are divided into plural m band channels, each band channel having a predetermined band width and respective band channels having bands which are different from each other.

Figure 5:
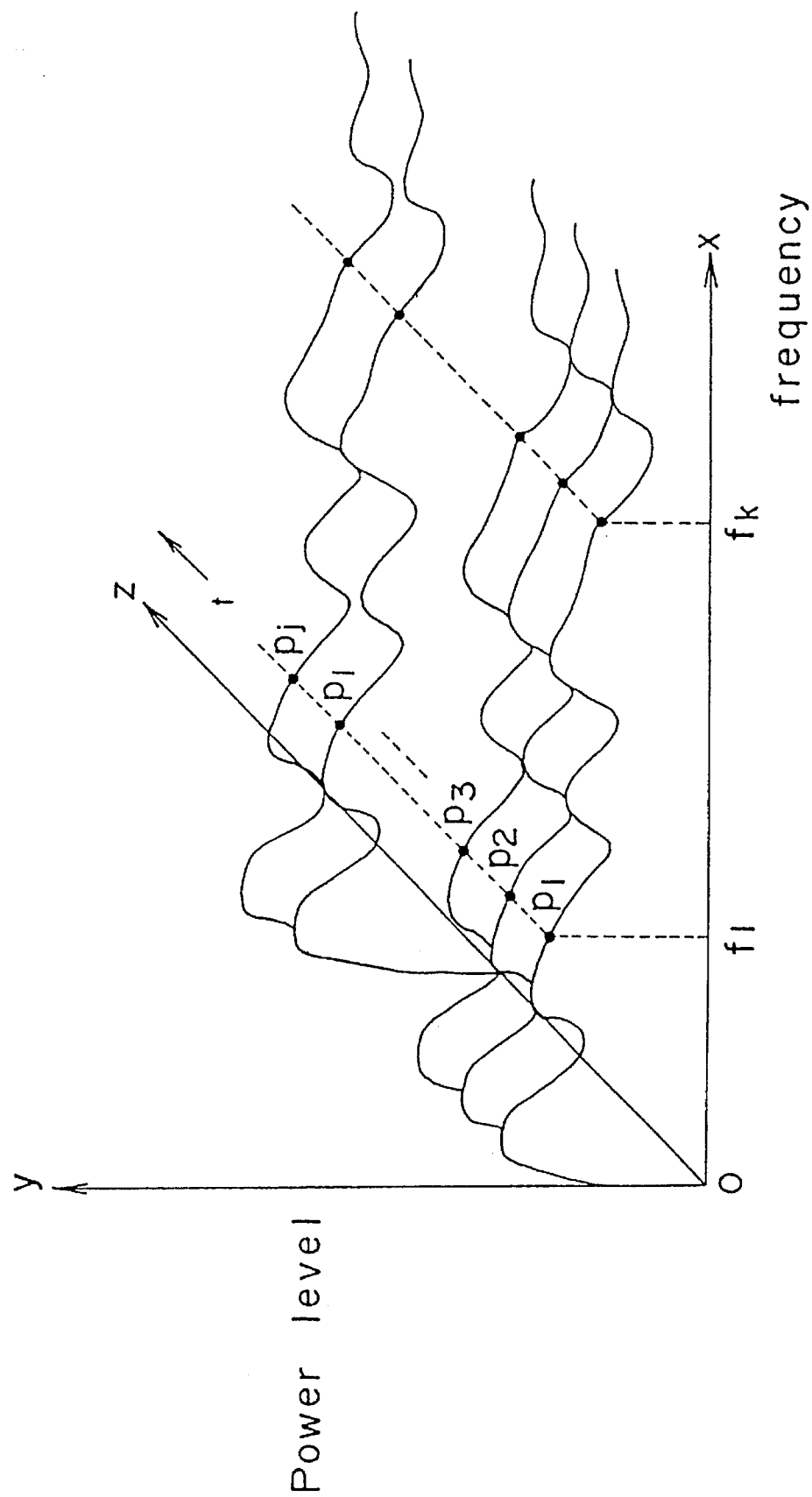
FIG. 5 is a graph for showing a noise prediction method used in the preferred embodiments.

FIG. 5 shows one example of a noise prediction method. In FIG. 5, an x-axis is a frequency, a y-axis is a power level of an inputted speech signal, and a z-axis is a time. In a frequency f1, there is data p1, p2, ..., pi as a time is elapsed, and then, data pj presenting after data pi on line of data p1, p2, ..., pi is predicted. For example, an average value of noise data p1 to pi is calculated, and then, the calculated average value is set at a predicted value pj. Alternatively, when a speech signal continuously exists, data pj is multiplied by an attenuation factor, and then, the product of the data pj and the attenuation factor is set at a predicted value.

The noise power calculation section 9 calculates a power level of the predicted noise such as an average value of an amplitude thereof. When the calculated power level of the predicted noise is larger than a predetermined threshold value, even though the cepstrum analysis result stored in the storage unit 2 is slightly different from the cepstrum analysis result outputted from the cepstrum analysis section 1, the maximum likelihood estimator 4 judges that they are substantially similar to each other, and the level of the similarity judgment standard is lowered. On the other hand, when the power level of the predicted noise is smaller than the predetermined threshold value, the maximum likelihood estimator 4 judges that there is substantially no noise, and then, the level of the similarity judgment standard is heightened.

The Third Preferred Embodiment

Figure 3:
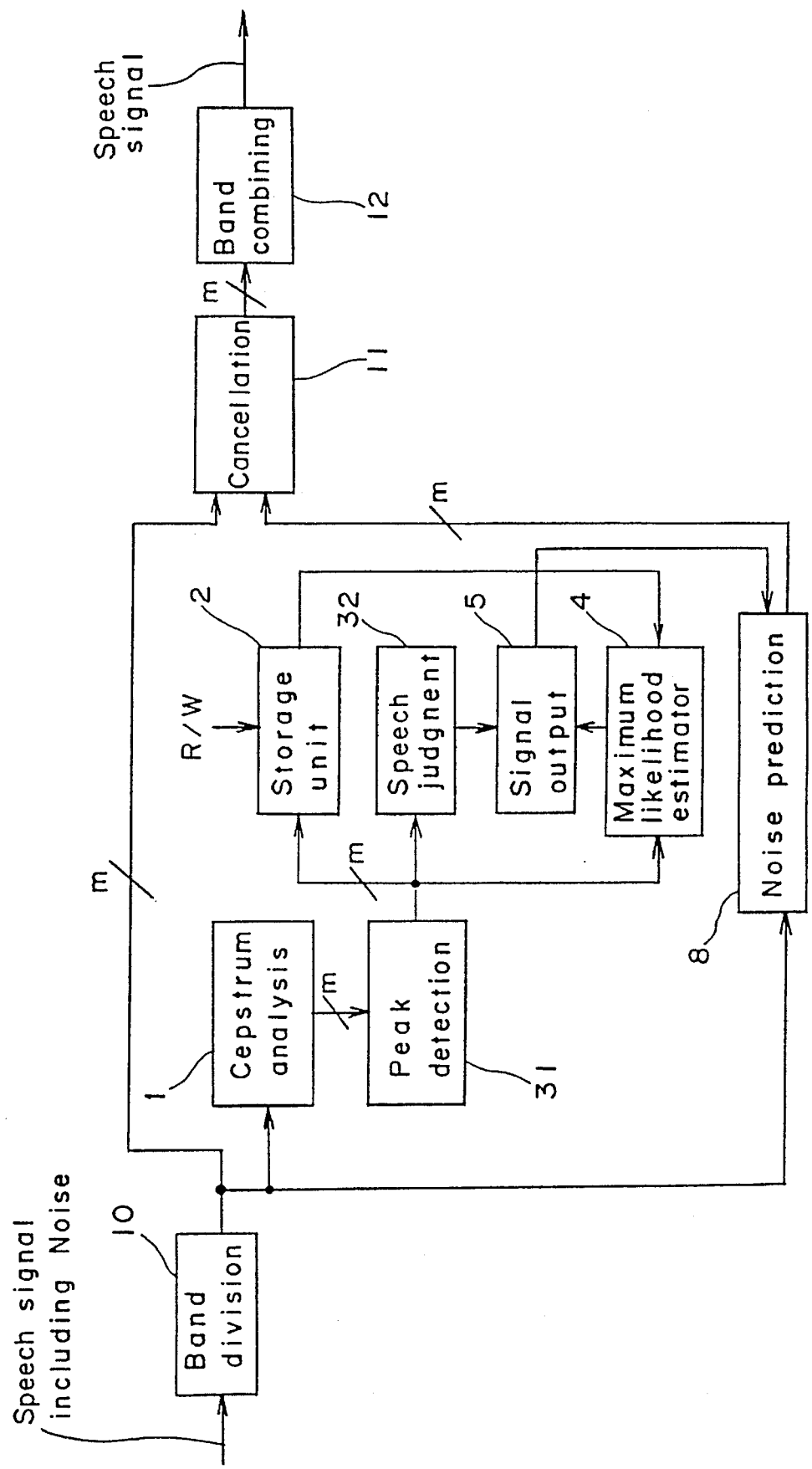
FIG. 3 is a schematic block diagram showing a noise suppression apparatus of a third preferred embodiment according to the present invention.

FIG. 3 shows a noise suppression apparatus of a third preferred embodiment according to the present invention. In FIG. 3, the same components as those shown in FIGS. 1 and 2 are denoted by the same references as those shown in FIGS. 1 and 2.

The noise suppression apparatus of the third preferred embodiment is characterized in outputting a noise-suppressed speech signal utilizing a prediction value of a predicted noise, and further comprises a band division section 10, a cancellation section 11 and a band combining section 12 in addition to the second preferred embodiment.

Referring to FIG. 3, a noisy speech signal is inputted to the band division section 10, and then, in response thereto, the band division section 10 converts the inputted analogue noisy speech signal into a digital noisy speech signal, Fourier-transforms the digital noisy speech signal into a spectrum signal, and then, divides the transformed spectrum signal into spectrum signals of plural m channels. The spectrum signals of plural m channels outputted from the band division section 10 are inputted to the above-mentioned cepstrum analysis section 1 and the noise prediction section 8. The noisy spectrum signals of respective frequency channels outputted from the band division section 10 are inputted to the cancellation section 11, and the cancellation section 11 rejects or cancels a noise of a prediction value predicted by the noise prediction section 8 as follows.

Figure 6A:
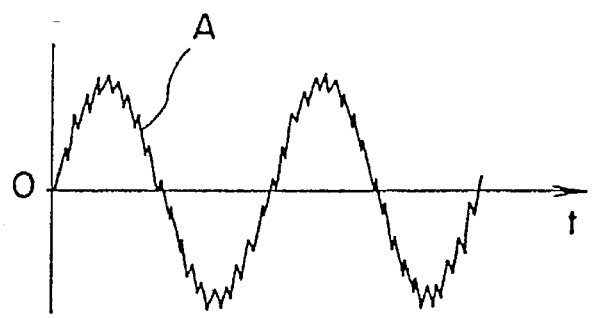
Figure 6B:
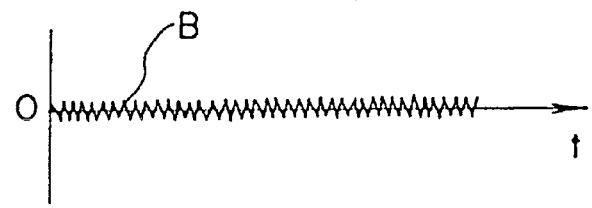
Figure 6C:
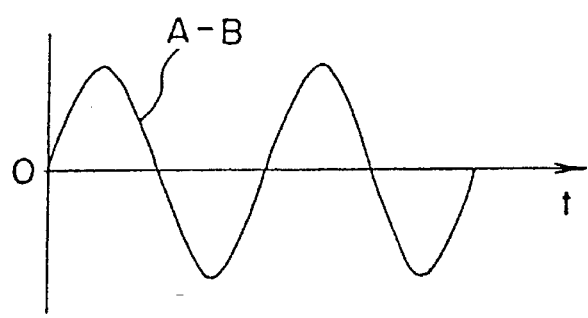

FIGS. 6(a)–6(c) show one example of a general cancellation method on a time axis. A noise waveform of FIG. 6(b) predicted by the noise prediction section 8 is subtracted from a noisy speech signal of FIG. 6(a), thereby extracting only a speech signal of FIG. 6(c).

In the present preferred embodiment, there is used a cancellation method on a frequency axis shown in FIGS. 7(a)–7(c). A noisy speech signal of FIG. 7(a) is Fourier-transformed into a spectrum signal of FIG. 7(b), and then, a spectrum of FIG. 7(c) of the predicted noise is subtracted from the converted spectrum signal of FIG. 7(b) so as to obtain the subtracted spectrum result of FIG. 7(d). Further, the subtracted spectrum result of FIG. 7(d) is inverse-Fourier-transformed into a speech signal of FIG. 7(e) including no noise or a noise-suppressed speech signal (e).

The band combining section 12 combines the spectrum signals of plural m channels outputted from the cancellation section 11, and inverse-Fourier-transforms the combined spectrum signals into a noise-suppressed speech signal.

As described above, in the preferred embodiment, a noise component is canceled from the noisy speech signal by the cancellation section 11, and a speech signal is obtained by the band combining section 12. Therefore, a noise-suppressed speech signal can be obtained together with information of a speaker of the speech signal.

It is to be noted that, in the preferred embodiment, as features to be stored in the storage unit 2, there is selected peak information of the cepstrum analysis results of respective speakers.

The Fourth Preferred Embodiment

Figure 8:
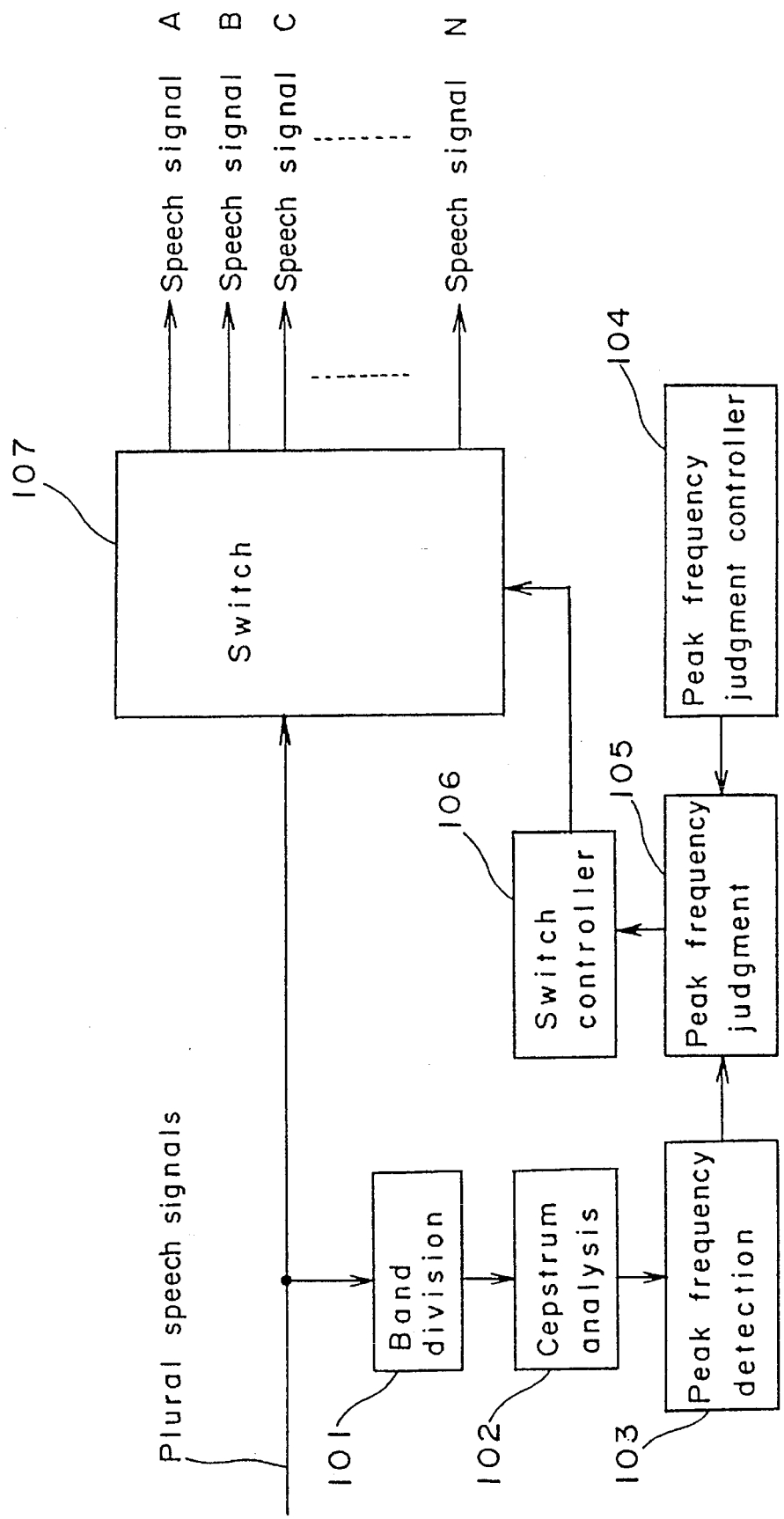
FIG. 8 is a schematic block diagram showing a signal processing apparatus of a fourth preferred embodiment according to the present invention.

FIG. 8 shows a signal processing apparatus of a fourth preferred embodiment according to the present invention.

The signal processing apparatus of the fourth preferred embodiment comprises a band division section 101, a cepstrum analysis section 102, a peak frequency detection section 103, a peak frequency judgment controller 104, a peak frequency judgment section 105, a switch controller 106 and a switch 107.

Referring to FIG. 8, the band division section 101 performs a band division process for speech signals of plural speakers, and for example, includes an analogue to digital converter for converting inputted analogue speech signals into digital speech signals, and a fast Fourier transformer (referred to as an FFT hereinafter) for Fourier-transforming the A/D converted speech signals into spectrum signals.

The cepstrum analysis section 102 performs a cepstrum analysis for the spectrum signals outputted from the band division section 101 and outputs data of the cepstrum analysis result to the peak frequency detection section 103. The peak frequency detection section 103 detects a peak or pitch frequency of the cepstrum analysis result in a manner similar to that of the signal judgment section 3 of the first preferred embodiment.

The peak frequency judgment controller 104 previously stores and outputs a peak frequency of each of speeches of plural speakers, sequentially. The peak frequencies of the speeches of plural speakers are different from each other. Therefore, the peak frequencies of the speeches of plural speakers are previously measured, and are stored therein in order to output them.

The peak frequency judgment section 105 compares the peak frequency detected by the peak frequency detection section 103 with various kinds of peak frequencies outputted from the peak frequency judgment controller 104, and detects which speaker the peak frequency detected by the peak frequency detection section 103 corresponds to. For example, the peak frequency judgment section 105 searches the peak frequency of a speaker which is closest to the detected peak frequency, and outputs the detection information to the switch controller 106.

The switch controller 106 outputs a switch control signal to the switch 107 according to the detection information inputted from the peak frequency judgment section 105.

On the other hand, the above-mentioned plural speech signals are inputted to the switch 107. The switch 107 outputs the speech signals by discriminating them by respective speakers according to the switch control signal outputted from the switch controller 106. For example, as shown in FIG. 8, speech signals are inputted to the switch 107 in an order of speakers D, A, B and C. These speech signals are outputted to the output terminals A, B, C, D, . . . , N by discriminating them by respective speakers.

An operation of the signal processing apparatus of the fourth preferred embodiment will be described below in detail.

The band division section 101 performs the band division process including the Fourier transformation for plural speech signals. The cepstrum analysis section 102 performs a cepstrum analysis for the spectrum signals of plural channels outputted from the band division section 101, and outputs the cepstrum analysis result to the peak frequency detection section 103. The peak frequency detection section 103 detects the peak frequency based on the cepstrum analysis result. On the other hand, the peak frequency judgment controller 104 outputs the peak frequencies of the speeches of respective speakers, sequentially, which are stored therein. The peak frequency judgment section 105 compares the detected peak frequency with the peak frequency sequentially transferred from the peak frequency judgment controller 104, detects which peak frequency of a speaker the detected peak frequency corresponds to, and outputs the detection information to the switch controller 106. The switch controller 106 outputs a switch control signal according to the detection information outputted from the peak frequency judgment section 105, to the switch 107. According to the switch control signal, the switch 107 makes the input terminal thereof connect to the output terminal A thereof if the inputted speech signal is judged as a speech signal of a speaker A. Further, the switch 107 makes the input terminal thereof connect to the output terminal B thereof if the inputted speech signal is judged as a speech signal of a speaker B. Thus, the speech signals of respective speakers are discriminated by respective speakers, and are outputted to the predetermined output terminals corresponding to the speakers.

The Fifth Preferred Embodiment

Figure 9:
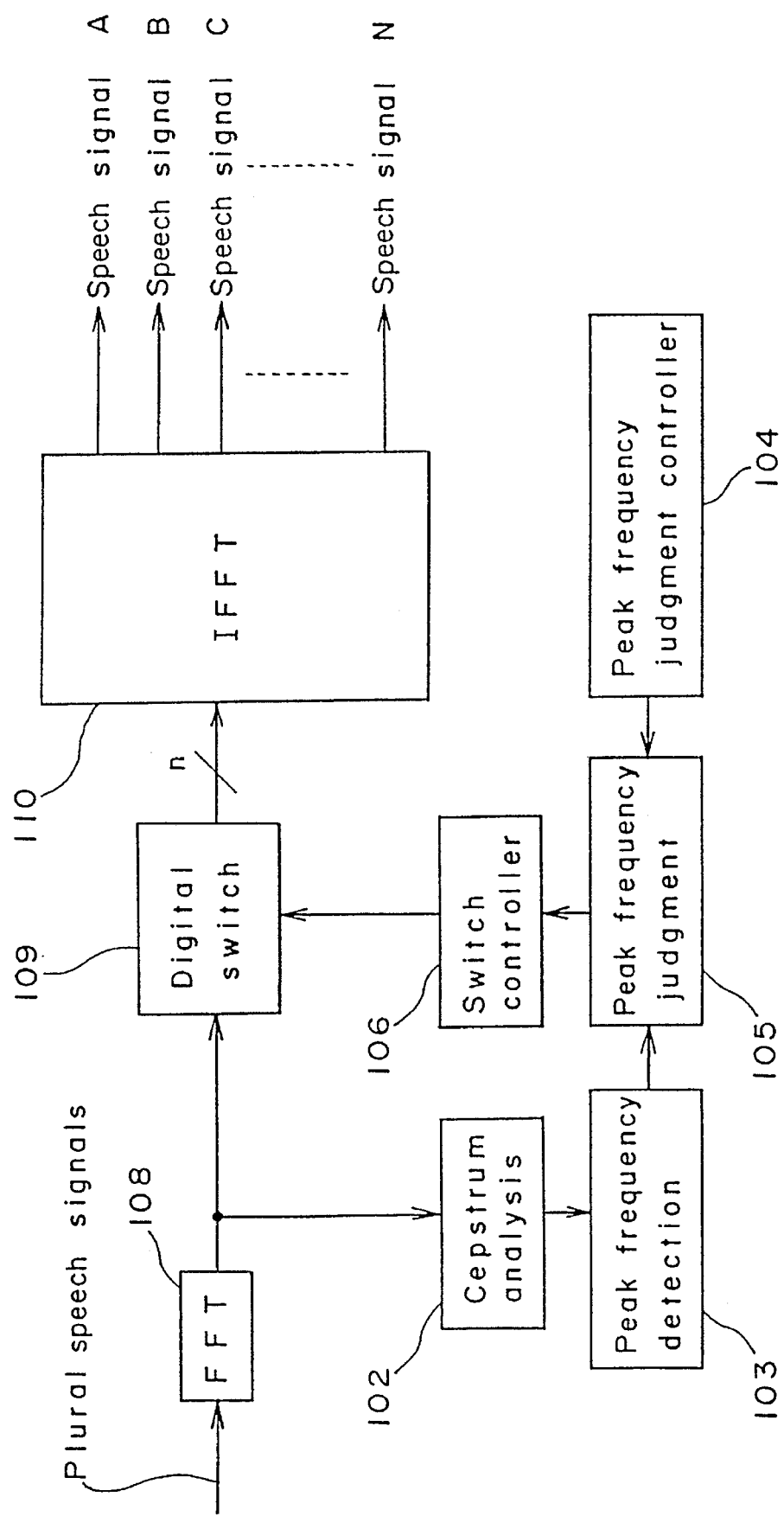
FIG. 9 is a schematic block diagram showing a signal processing apparatus of a fifth preferred embodiment according to the present invention.

FIG. 9 shows a signal processing apparatus of a fifth preferred embodiment according to the present invention. In FIG. 9, the same components as those shown in FIG. 8 are denoted by the same references as those shown in FIG. 8.

In the signal processing apparatus of the fifth preferred embodiment, as compared with the fourth preferred embodiment, an FFT 108 is provided instead of the band division section 101, a digital switch 109 is provided instead of the switch 107, and the signal processing apparatus of the fifth preferred embodiment further comprises an inverse fast Fourier transformer (referred to as an IFFT hereinafter) 110 in addition to the fourth preferred embodiment.

The FFT 108 performs a Fourier transformation process for speech signals of plural speakers and outputs spectrum signals of plural speakers to the cepstrum analysis section 102 and the digital switch 109. The cepstrum analysis section 102, the peak frequency detection section 103, the peak frequency judgment controller 104, the peak frequency judgment section 105 and the switch controller 106 are the same as those shown in FIG. 8, and therefore, the description of these sections is omitted therein.

The spectrum signals outputted from the FFT 108 are inputted to the digital switch 109. The digital switch 109 outputs the spectrum signals of respective speakers to the IFFT 110, discriminating them by respective speakers into plural n channels according to the control signal outputted from the switch controller 106. The IFFT 110 10 performs an inverse Fourier transformation process for the spectrum signals of plural n channels outputted from the digital switch 109, and outputs the transformed speech signals to respective output terminals A, B, C, . . . , N by respective speakers.

The Sixth Preferred Embodiment

Figure 10:
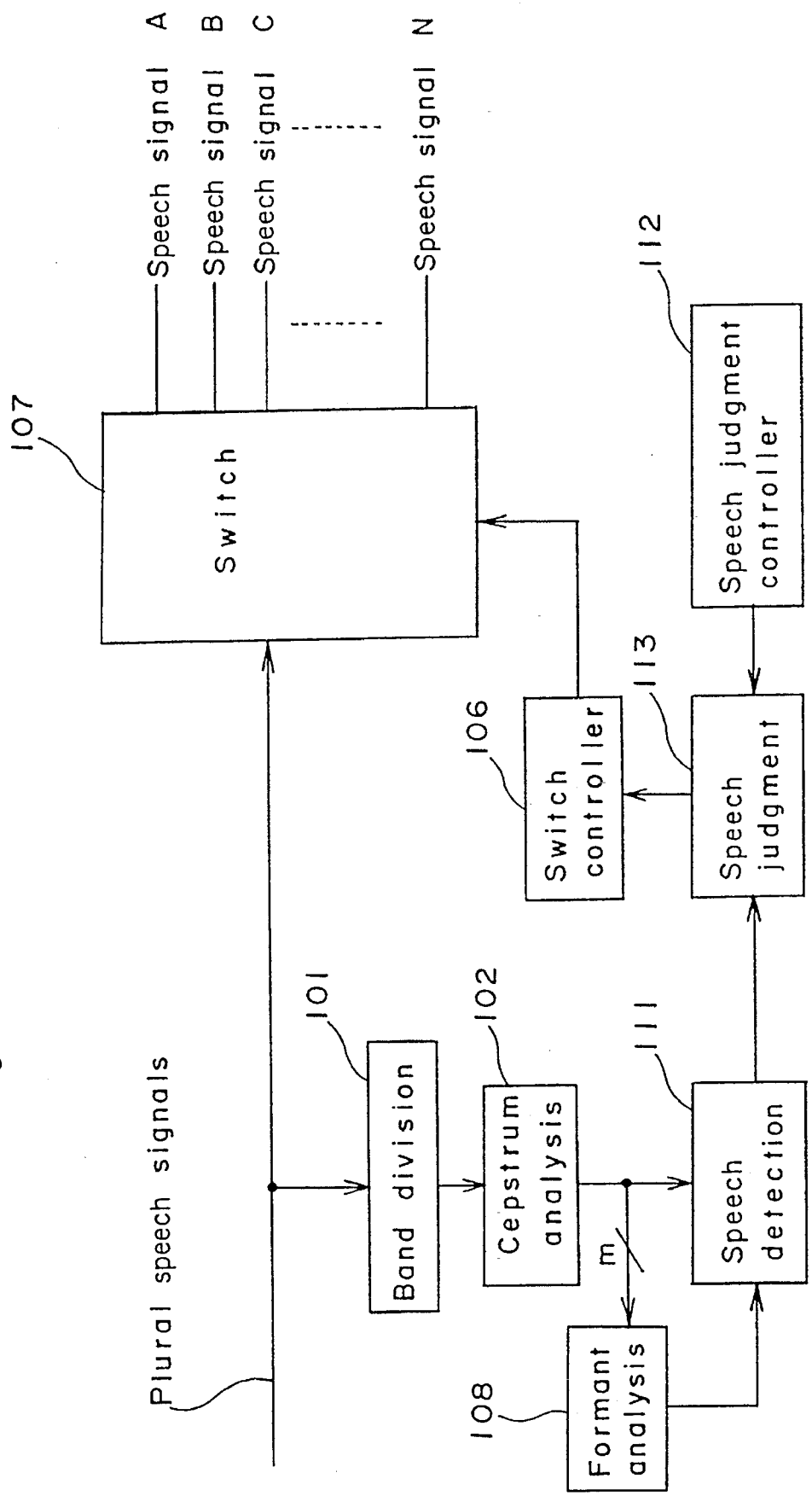
FIG. 10 is a schematic block diagram showing a signal processing apparatus of a sixth preferred embodiment according to the present invention.

FIG. 10 shows a signal processing apparatus of a sixth preferred embodiment according to the present invention. In FIG. 10, the same components as those shown in FIG. 8 are denoted by the same references as those shown in FIG. 8.

The signal processing apparatus of the sixth preferred embodiment is characterized in, as compared with the fourth preferred embodiment, comprising a formant analysis section 108, a speech detection section 111, a speech judgment section 113 and a speech judgment controller 112 instead of the peak frequency detection section 103, the peak frequency judgment controller 104, the peak frequency judgment section 105 of the fourth preferred embodiment. Since the band division section 101, the cepstrum analysis section 102, the switch controller 106 and the switch 107 are the same as those shown in FIG. 8, the description of these components is omitted below.

The formant analysis section 108 analyzes a formant shown in FIG. 4b of a cepstrum which is obtained by the cepstrum analysis section 102. It is to be noted that the formant corresponds to an envelop of a spectrum of a speech signal.

The pitch information etc. of the cepstrum analysis result outputted from the cepstrum analysis section 102 and the formant analysis result outputted from the formant analysis section 108 are inputted to the speech detection section 111, and in response thereto, the speech detection section 111 detects speech features of a speech signal and outputs data of the speech features to the speech judgment section 113.

The speech judgment controller 112 outputs speech features of speeches of plural speakers, sequentially. The speech features of plural speakers are different from each other. Therefore, the speech features of plural speakers are previously measured and are stored therein in order to output them, sequentially, to the speech judgment section 113.

The speech judgment section 113 compares the speech features detected by the speech detection section 111 with the speech features outputted from the speech judgment controller 112, and detects which speech features of a speaker the detected speech features of the inputted speech signal correspond to. In the speech judgment section 113, for example, there is used a pattern matching method which is well known to those skilled in the art.

The Seventh Preferred Embodiment

Figure 11:
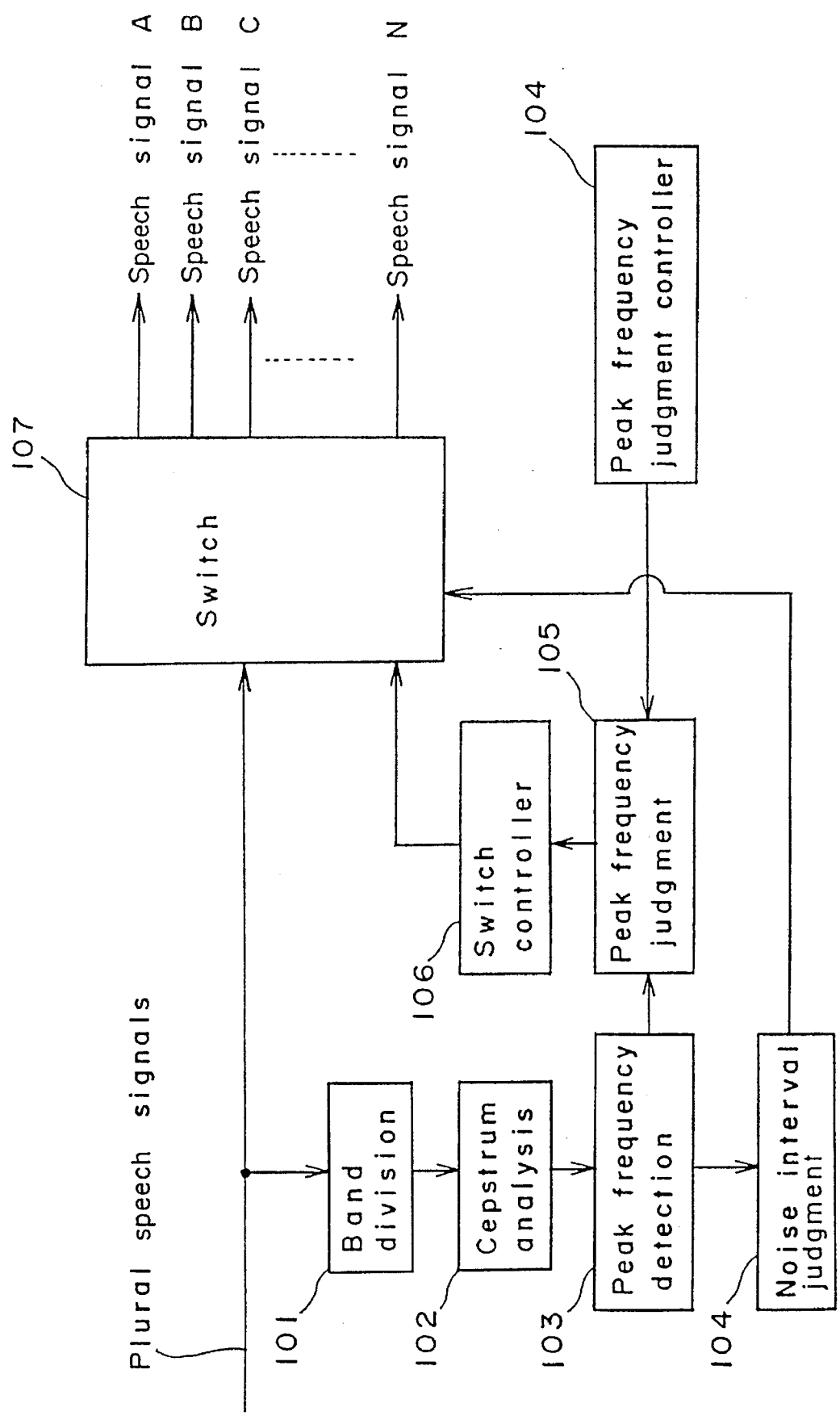
FIG. 11 is a schematic block diagram showing a signal processing apparatus of a seventh preferred embodiment according to the present invention.

FIG. 11 shows a signal processing apparatus of a seventh preferred embodiment according to the present invention. In FIG. 11, the same components as those shown in FIG. 8 are denoted by the same references as those shown in FIG. 8.

The signal processing apparatus is characterized in comprising a noise interval judgment section 114 in addition to the fourth preferred embodiment shown in FIG. 8, and the switch 107 outputs speech signals discriminating between a speech and a noise by each speech signal.

The noise interval judgment section 114 detects a speech interval based on information of the peak frequency detected by the peak frequency detection section 103, and detects a noise interval by inverting the detected speech interval. Information of the noise interval is inputted to the switch 107. The switch 107 switches over itself based on the information of the noise interval so that the noise of respective speech signals is outputted to a noise output terminal. On the other hand, the speech signals of respective speakers are outputted to the output terminals discriminating them by respective speakers, and also discriminating between the noise and the speech signals so as to output them to the particular noise output terminal.

For example, a noise such as an engine sound of an automobile and a sound of an airplane may be outputted to the noise output terminal.

The Eighth Preferred Embodiment

Figure 12:
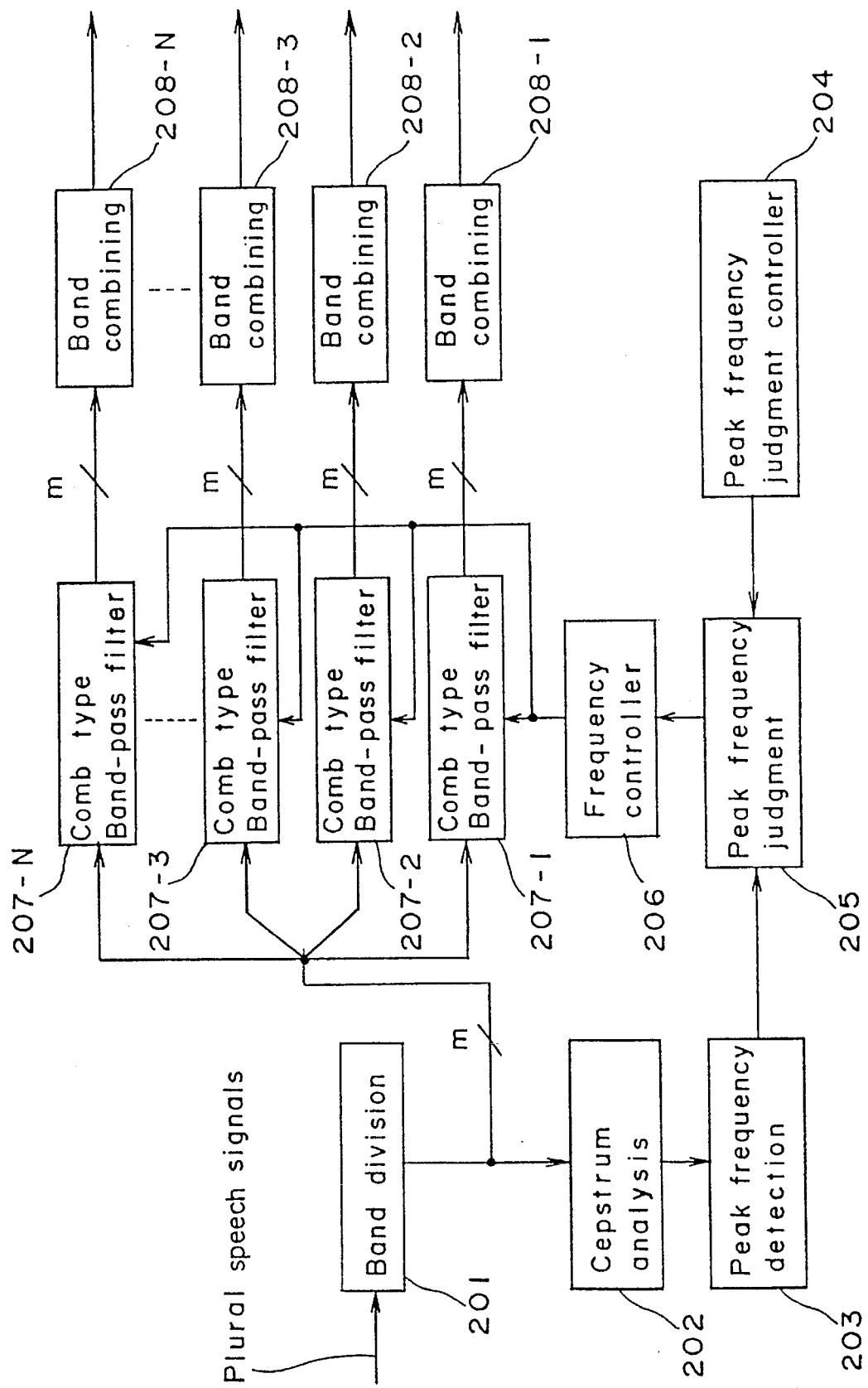
FIG. 12 is a schematic block diagram showing a signal processing apparatus of an eighth preferred embodiment according to the present invention.

FIG. 12 shows a signal processing apparatus of an eighth preferred embodiment according to the present invention. In FIG. 12, the same components as those shown in FIG. 8 are denoted by the same references as those shown in FIG. 8.

The signal processing apparatus of the eighth preferred embodiment comprises a band division section 201, a cepstrum analysis section 202, a peak frequency detection section 203, a peak frequency judgment controller 204, a peak frequency judgment section 205, a frequency controller 206, plural N comb type band-pass filters 207-1 to 207-N and plural N band combining sections 208-1 to 208-N.

The band division section 201, the cepstrum analysis section 202, the peak frequency detection section 203, the peak frequency judgment controller 204 and the peak frequency judgment section 205 are constituted in manners similar to those of the band division section 101, the cepstrum analysis section 102, the peak frequency detection section 103, the peak frequency judgment controller 104 and the peak frequency judgment section 105, which are used in the fourth preferred embodiment shown in FIG. 8.

It is to be noted that a position on a quefrency where a peak of a speech appears changes depending on a speaker. Therefore, when plural speakers speak simultaneously, the peaks of speeches of respective speakers are located at positions on the quefrency which are different from each other in the cepstrum. The peak frequency judgment section 205 detects plural speakers who output speeches even though plural speakers speak simultaneously, and outputs a detection signal representing the detection result. For example, when speeches of speakers A and D are outputted toward the signal processing apparatus, simultaneously, the peak frequency judgment section 205 judges that the speakers A and D speak.

In response to the detection signal outputted from the peak frequency judgment section 205, the frequency controller 206 adjusts comb type filtering functions of the comb type band-pass filters 207-1 to 207-N under optimum conditions so that they pass only speech signals corresponding to the speakers. For example, the frequency controller 206 outputs an optimum comb type filtering function information derived from the information of the peak frequency of the speech of the speaker A (which is an optimum filtering information for the comb type band-pass filter 207-1's certainly passing the speech signal of the speaker A) as a control signal to the comb type band-pass filter 207-1. Further, for example, the frequency controller 206 outputs an optimum comb type filtering function information derived from the information of the peak frequency of the speech of the speaker D (which is an optimum filtering information for the comb type band-pass filter 207-4's certainly passing the speech signal of the speaker D) as a control signal to the comb type band-pass filter 207-4.

The speech signals of plural m channels for which the above-mentioned band division process has been performed by the band division section 201 are inputted to the comb type band-pass filters 207-1 to 207-N. According to the control signals outputted from the frequency controller 206, the comb type band-pass filters 207-1 to 207-N filter the inputted speech signals adjusting the filtering functions under optimum conditions so as to pass only speech signals having the peak frequencies which are detected by the peak frequency judgment section 205. The comb type band-pass filters 207-1 to 207-N are provided so as to correspond to the speakers A, B, C, D, E, . . . Therefore, with respect to the speech signal of the speaker A, the filtering function of the comb type band-pass filter 207-1 is adjusted so that only the speech signal of the speaker A is passed therethrough, and also with respect to the speech signal of the speaker D, the filtering function of the comb type band-pass filter 207-4 is adjusted so that only the speech signal of the speaker D is passed therethrough.

There is considered a method for, for example, fixing the adjustments of the comb type band-pass filters 207-1 and 207-4 under optimum conditions for the speech signals of the speakers A and D. However, since a practical speech of a speaker changes depending on the speaker's physical condition, a time and an environment, the passing center frequency of the corresponding comb type band-pass filter is adjusted by the detected peak frequency so as to become an optimum condition. Further, after the filtering function of the corresponding comb type band-pass filter is adjusted under optimum conditions, the band width of the corresponding comb type band-pass filter may be widened.

Each of the band combining sections 208-1 to 208-N combines the speech signals of plural m channels outputted from each of the comb type band-pass filters 207-1 to 207-N and outputs the combined speech signal. Each of the band combining sections 208-1 to 208-N is constituted by an IFFT for performing an inverse Fourier transformation for inputted spectrum signals.

An operation of the signal processing apparatus of the eighth preferred embodiment will be described below in detail.

The peak frequency judgment controller 204 previously stores the peak frequencies of respective speakers therein which are obtained from the cepstrum analysis results obtained from the speech signals of respective speakers.

Speech signals of plural speakers are inputted to the band division section 201, and the band division section 201 performs a band division process including a Fourier transformation therefor. The cepstrum analysis section 202 performs a cepstrum analysis for the spectrum signals of plural m channels for which the above-mentioned band division process has been performed. The peak frequency detection section 203 detects a peak frequency from the cepstrum analysis result outputted from the cepstrum analysis section 202. When the inputted signals are composed of only noise and do not include any speech signal, the peak frequency detection section 203 does not detect any peak frequency. When the inputted signals are composed of speech signals of plural speakers, the peak frequency detection section 203 detects plural peak frequencies corresponding to the plural speakers.

On the other hand, the peak frequency judgment controller 204 sequentially outputs the peak frequencies of plural speakers which are previously stored therein, to the peak frequency judgment section 205. The peak frequency judgment section 205 compares the peak frequency detected by the peak frequency detection section 203 with the peak frequencies sequentially outputted from the peak frequency judgment controller 204, selects one of the peak frequencies which is the most like the detected peak frequency, and outputs information of the detection result to the frequency controller 206. The speaker of the speech signal of the selected peak frequency is one who speaks the speech of the speech signal. Based on the information of the detection result outputted from the peak frequency judgment section 205, the frequency controller 206 outputs a control signal for adjusting the filtering function of the comb type band-pass filter (one of 207-1 to 207-N) corresponding to the speaker under optimum conditions which are derived from the detected peak frequency. The filtering functions of respective comb type band-pass filters 207-1 to 207-N are adjusted under optimum conditions, and the comb type band-pass filters 207-1 to 207-N output the speech signals of respective speakers discriminating them by respective speakers.

For example, in the case of the speech signal of the speaker A, the filtering function of only the comb type band-pass filter 207-1 is adjusted under optimum conditions, and then, the comb type band-pass filter 207-1 passes the speech signal of the speaker A and outputs it to the band combining section 208-1. Further, in the case of the speech signal of the speaker D, the filtering function of only the comb type band-pass filter 207-4 is adjusted under optimum conditions, and then, the comb type band-pass filter 207-4 passes the speech signal of the speaker D and outputs it to the band combining section 208-4. Thus, even though plural speakers speak simultaneously, the speech signals of respective speakers are outputted discriminating them by respective speakers. Finally, each of the band combining section 208-1 to 208-N combines the speech signals of plural m channels inputted from each of the comb type band-pass filters 207-1 to 207-N, inverse-Fourier-transforms them, and outputs the combined speech signal.

The Ninth Preferred Embodiment

Figure 13:
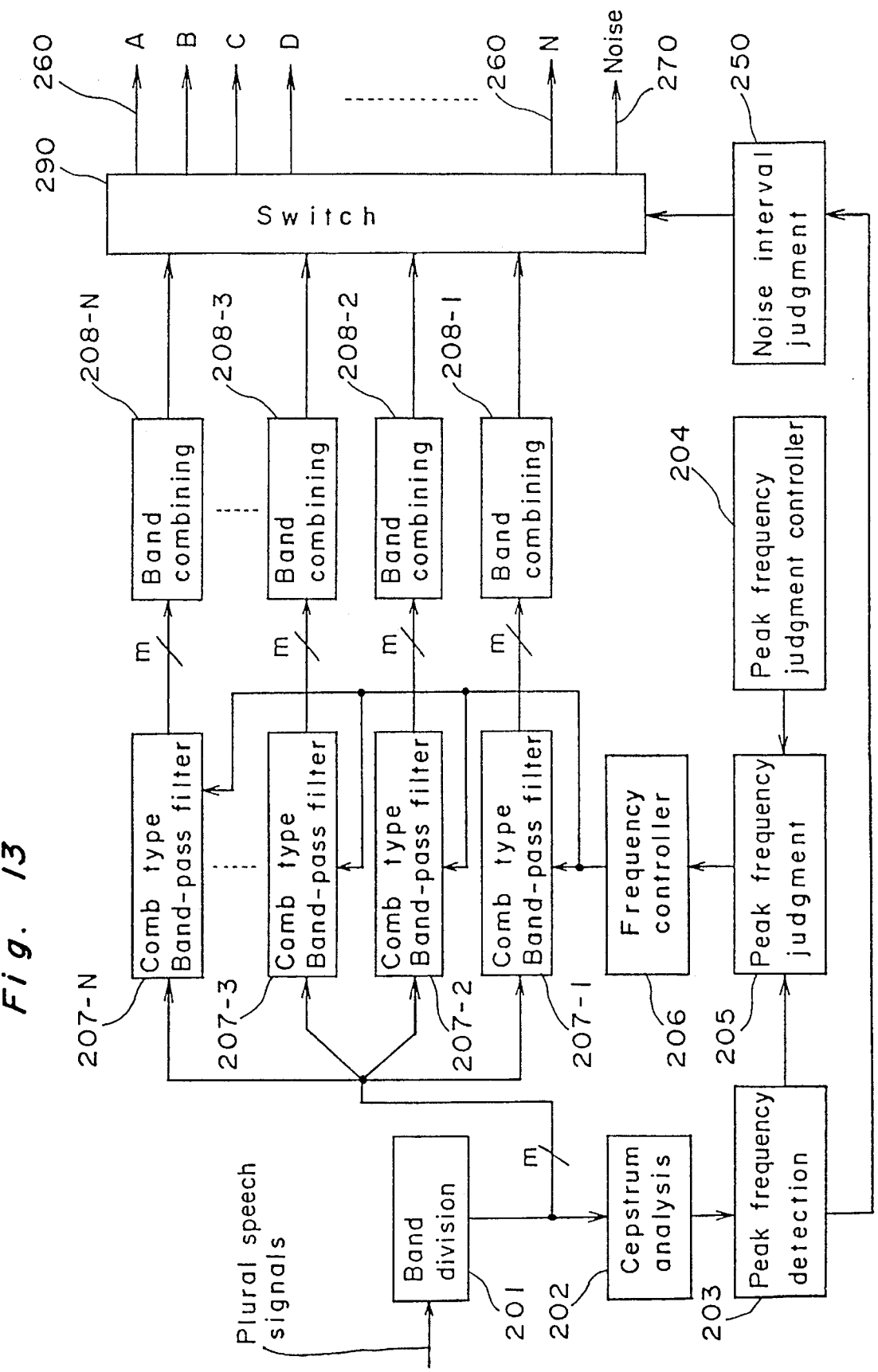
FIG. 13 is a schematic block diagram showing a signal processing apparatus of a ninth preferred embodiment according to the present invention.

FIG. 13 shows a signal processing apparatus of a ninth preferred embodiment according to the present invention. In FIG. 13, the same components as those shown in FIG. 12 are denoted by the same references as those shown in FIG. 12.

The signal processing apparatus of the ninth preferred embodiment is characterized in further comprising a noise interval judgment section 250 and a switch 290 in addition to the eighth preferred embodiment shown in FIG. 12. Differences between the ninth and eighth preferred embodiments will be described below in detail.

Referring to FIG. 13, the information of the peak frequency outputted from the peak frequency detection section 203 is inputted to the noise interval judgment section 250, and in a manner similar to that of the noise interval judgment section 114 shown in FIG. 7, the noise interval judgment section 250 detects a noise interval when a noise such as a sound of an engine of an automobile is generated by inverting a speech interval, and outputs a signal representing the detected noise interval to the switch 290. According to the signal representing the noise interval, the switch 290 outputs a noise signal for a noise interval outputted from the band combining sections 208-1 to 208-N to a noise output terminal 270. On the other hand, for a speech interval, the switch 290 outputs the speech signals of respective speakers to respective speech signal output terminals A to N, thereby outputting speech signals and a noise signal by discriminating between the speech signals and the noise signal.

The Tenth Preferred Embodiment

Figure 14:
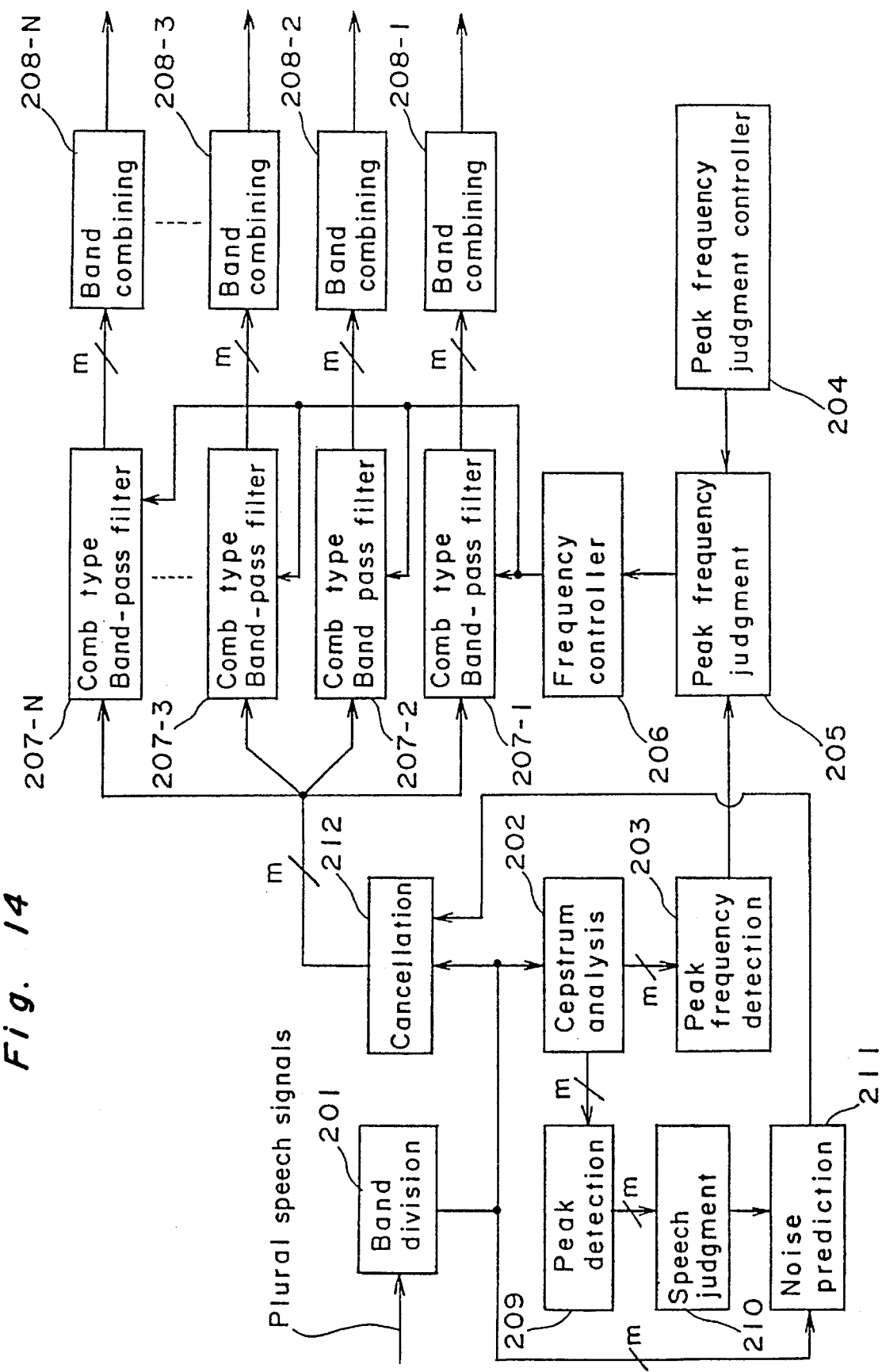
FIG. 14 is a schematic block diagram showing a signal processing apparatus of a tenth preferred embodiment according to the present invention.

FIG. 14 shows a signal processing apparatus of a tenth preferred embodiment according to the present invention. In FIG. 14, the same components as those shown in FIG. 12 are denoted by the same references as those shown in FIG. 12.

The signal processing apparatus of the tenth preferred embodiment is characterized in further comprising a peak detection section 209, a speech judgment section 210, a noise prediction section 211 and a cancellation section 212 in addition to the eighth preferred embodiment shown in FIG. 12.

The peak detection section 209, the speech judgment section 210, the noise prediction section 211 and the cancellation section 212 are constituted in manners similar to those of the peak detection section 31, the speech judgment section 32, the noise prediction section 8 and the cancellation section 11 which are used in the third preferred embodiment shown in FIG. 3.

In the signal processing apparatus constructed as described above, the cancellation section 212 outputs noise-suppressed spectrum signals of plural m channels to the comb type band-pass filters 207-1 to 207-N. Each of the comb type band-pass filters 207-1 to 207-N performs the above-mentioned filtering process for the inputted noise-suppressed spectrum signals and outputs a combined speech signal.

The Eleventh Preferred Embodiment

Figure 15:
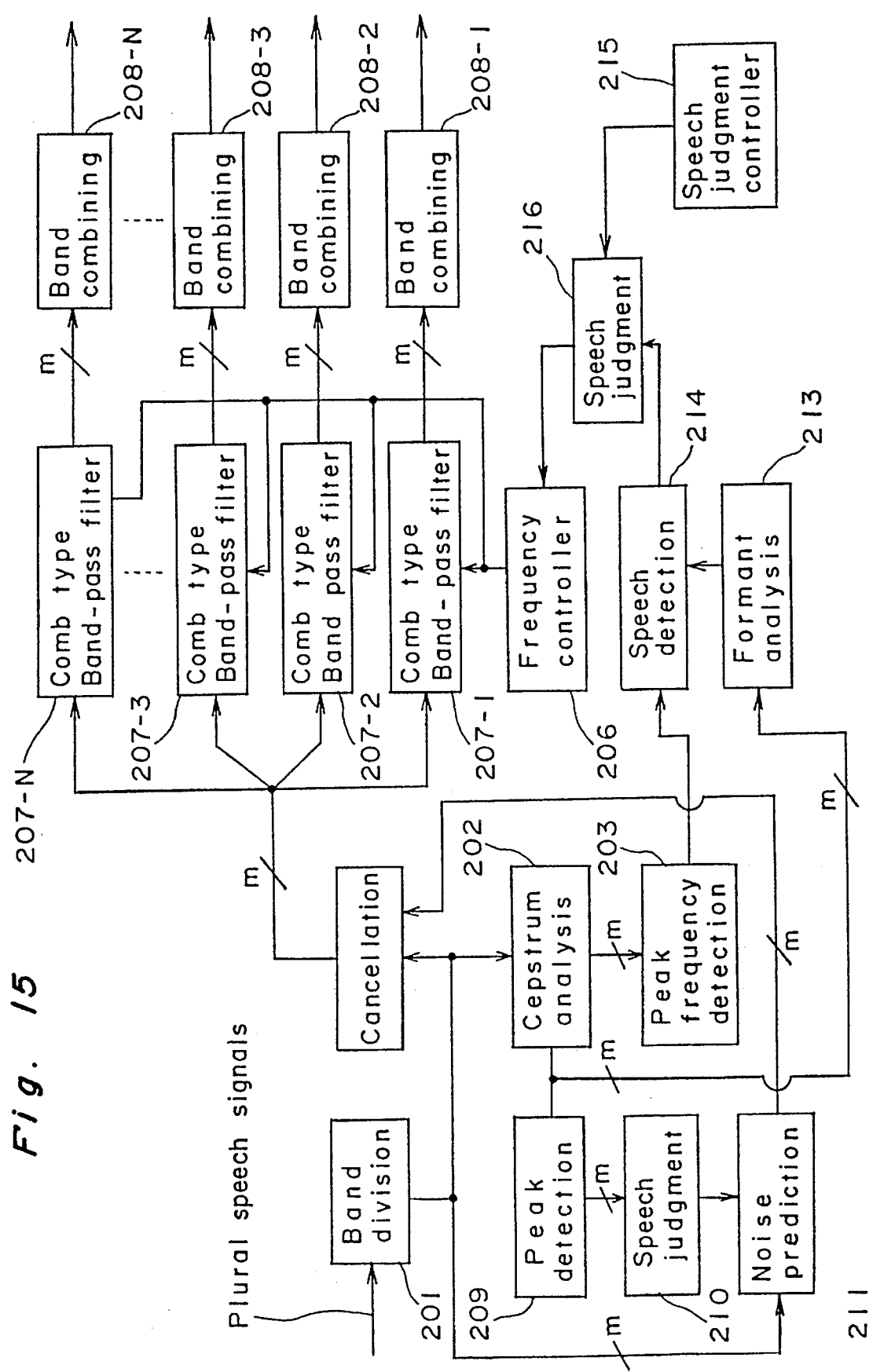
FIG. 15 is a schematic block diagram showing a signal processing apparatus of an eleventh preferred embodiment according to the present invention.

FIG. 15 shows a signal processing apparatus of an eleventh preferred embodiment according to the present invention. In FIG. 15, the same components as those shown in FIG. 14 are denoted by the same references as those shown in FIG. 14.

As compared with the tenth preferred embodiment shown in FIG. 14, the signal processing apparatus of the eleventh preferred embodiment is characterized in comprising a formant analysis section 213, a speech detection section 214, a speech judgment controller 215 and a speech judgment section 216 instead of the peak frequency judgment controller 204 and the peak frequency judgment section 205. Since the band division section 201, the cepstrum analysis section 202, the peak frequency detection section 203, the frequency controller 206, the comb type band-pass filters 207-1 to 207-N, the band combining section 208, the peak detection section 209, the speech judgment section 210, the noise prediction section 211 and the cancellation section 212 are constituted in manners similar to those of these sections of the tenth preferred embodiment shown in FIG. 14, the description of these sections is omitted below.

The formant analysis section 213, the speech detection section 214, the speech judgment controller 215 and the speech judgment section 216 are constituted in manners similar to those of the formant analysis section 108, the speech detection section 111, the speech judgment controller 112 and the speech judgment section 113, which are used in the sixth preferred embodiment shown in FIG. 10.

In the present preferred embodiment, since speech features of an inputted speech signal are detected utilizing the formant analysis result, the speech signals of respective speakers can be more correctly discriminated and outputted.

The Twelfth Preferred Embodiment

Figure 16:
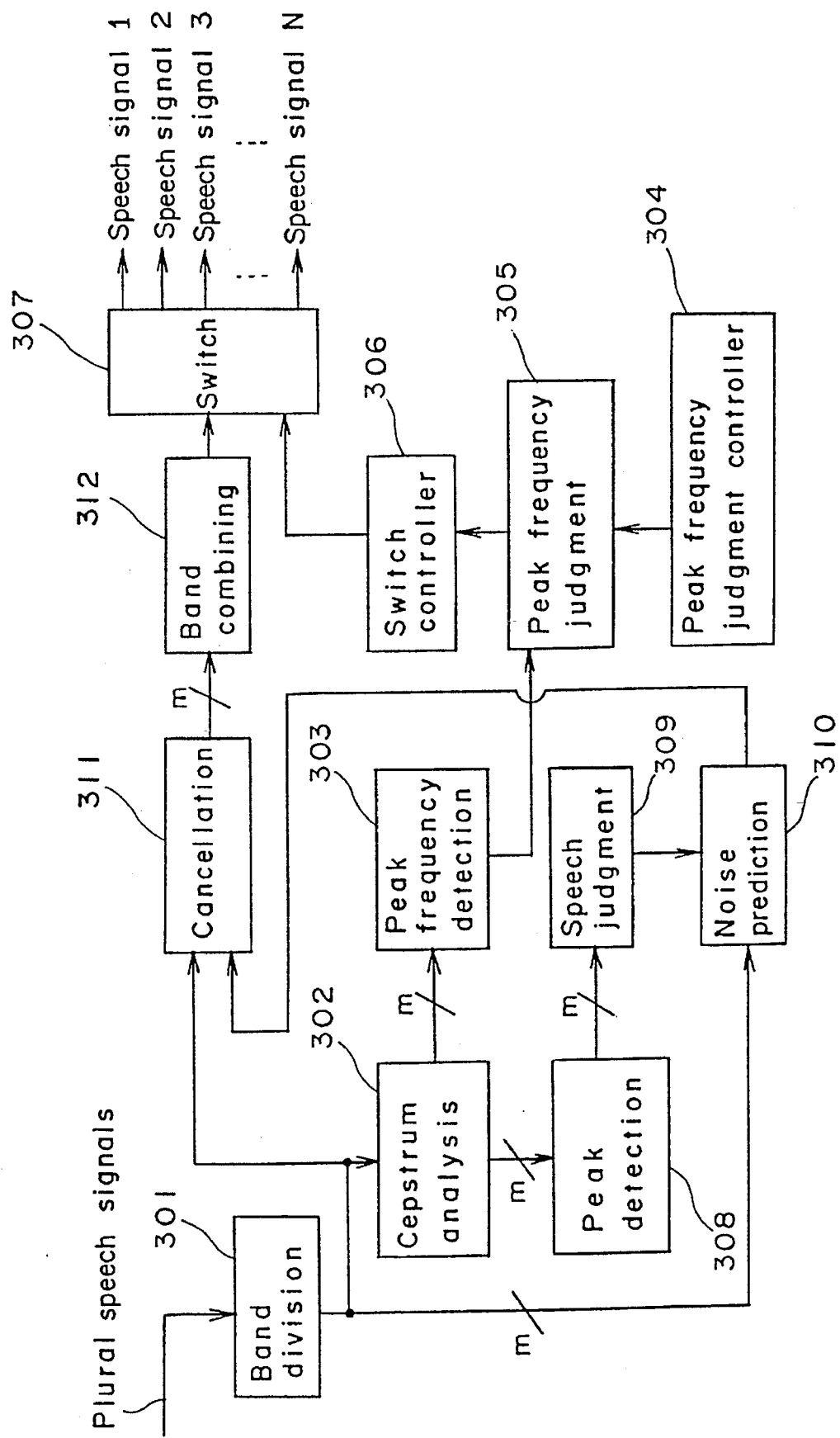
FIG. 16 is a schematic block diagram showing a signal processing apparatus of a twelfth preferred embodiment according to the present invention.

FIG. 16 shows a signal processing apparatus of a twelfth preferred embodiment according to the present invention.

The signal processing apparatus of the twelfth preferred embodiment comprises a band division section 301, a cepstrum analysis section 302, a peak frequency detection section 303, a peak frequency judgment controller 304, a peak frequency judgment section 305, a switch controller 306, a switch 307, a peak detection section 308, a speech judgment section 309, a noise prediction section 310, a cancellation section 311 and a band combining section 312. The band division section 301, the cepstrum analysis section 302, the peak frequency detection section 303, the peak frequency judgment controller 304, the peak frequency judgment section 305, the peak detection section 308, the speech judgment section 309, the noise prediction section 310 and the cancellation section 311 are constituted in manners similar to those to the band division section 201, the cepstrum analysis section 202, the peak frequency detection section 203, the peak frequency judgment controller 204, the peak frequency judgment section 205, the peak detection section 209, the speech judgment section 210, the noise prediction section 211 and the cancellation section 212 which are used in the tenth preferred embodiment shown in FIG. 14.

Referring to FIG. 16, the switch controller 306 outputs a switch control signal to the switch 307 according to the detection information detected by the peak frequency judgment section 305. The band combining section 312 performs a band combining process including an inverse Fourier transformation for the speech signals of plural m channels outputted from the cancellation section 311. It is to be noted that the band combining section 312 is constituted by an IFFT.

The combined speech signal outputted from the band combining section 312 is inputted to the switch 307, and the switch 307 outputs the speech signals of respective speakers discriminating them by respective speakers according to the switch control signal outputted from the switch controller 306. For example, when speech signals are inputted to the signal processing apparatus in an order of the speakers D, A, B and C, the speech signals of the speakers D, A, B and C are outputted to the output terminals 4, 1, 2 and 3 discriminating them by respective speakers. Namely, when a speech signal of the speaker A is inputted to the signal processing apparatus, the switch 307 switches over itself so that the speech signal of the speaker A is outputted to the output terminal 1. Further, when a speech signal of the speaker B is inputted to the signal processing apparatus, the switch 307 switches over itself so that the speech signal of the speaker B is outputted to the output terminal 2. Thus, the speech signals of respective speakers are discriminated and outputted to the output terminals.

The Thirteenth Preferred Embodiment

Figure 17:
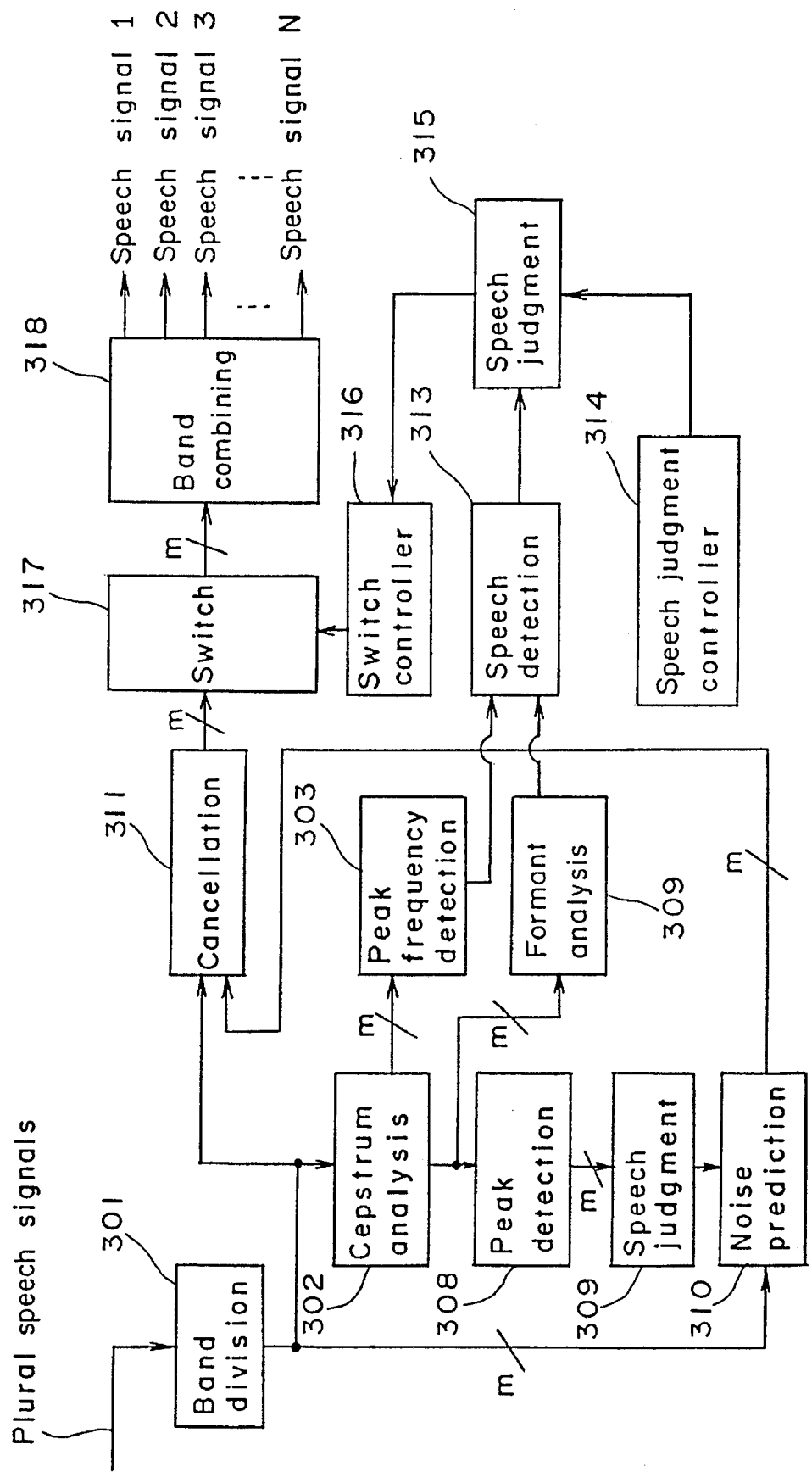
FIG. 17 is a schematic block diagram showing a signal processing apparatus of a thirteenth preferred embodiment according to the present invention.

FIG. 17 shows a signal processing apparatus of a thirteenth preferred embodiment according to the present invention. In FIG. 17, the same components shown in FIG. 16 are denoted by the same references as those shown in FIG. 16.

In the present preferred embodiment, since the band division section 301, the cepstrum analysis section 302, the peak frequency detection section 303, the peak detection section 308, the speech judgment section 309, the noise prediction section 310 and the cancellation section 311 are similar to those shown in FIG. 16, the description of these sections is omitted below. Further, a formant analysis section 319, a speech detection section 313, a speech judgment controller 314 and a speech judgment section 315 are constituted in manners similar to those of the formant analysis section 213, the speech detection section 214, the speech judgment controller 215 and the speech judgment section 216 which are used in the eleventh preferred embodiment shown in FIG. 15.

A switch controller 316 outputs a control signal to the switch 317 according to the speech detection result outputted from the speech judgment section 315. The spectrum signals of plural m channels outputted from the cancellation section 311 are inputted to the switch 317, and the switch 317 performs a switching process for the inputted spectrum signals of plural m channels according to the switch control signal outputted from the switch controller 316, namely, the spectrum signals of plural m channels are outputted or are not outputted to the band combining section 318 according thereto. The band combining sections 318 performs a band combining process including an inverse Fourier transformation for the inputted spectrum signals of plural m channels and outputs the combined speech signal to the output terminals.

In the present preferred embodiment, the formant analysis result is utilized upon detecting speeches of respective speakers, the speech features of respective speakers are grasped more correctly, and the speech detection is performed more correctly. Then, the speech signals of respective speakers are discriminated more correctly and are outputted by respective speakers.

The Fourteenth Preferred Embodiment

Figure 18:
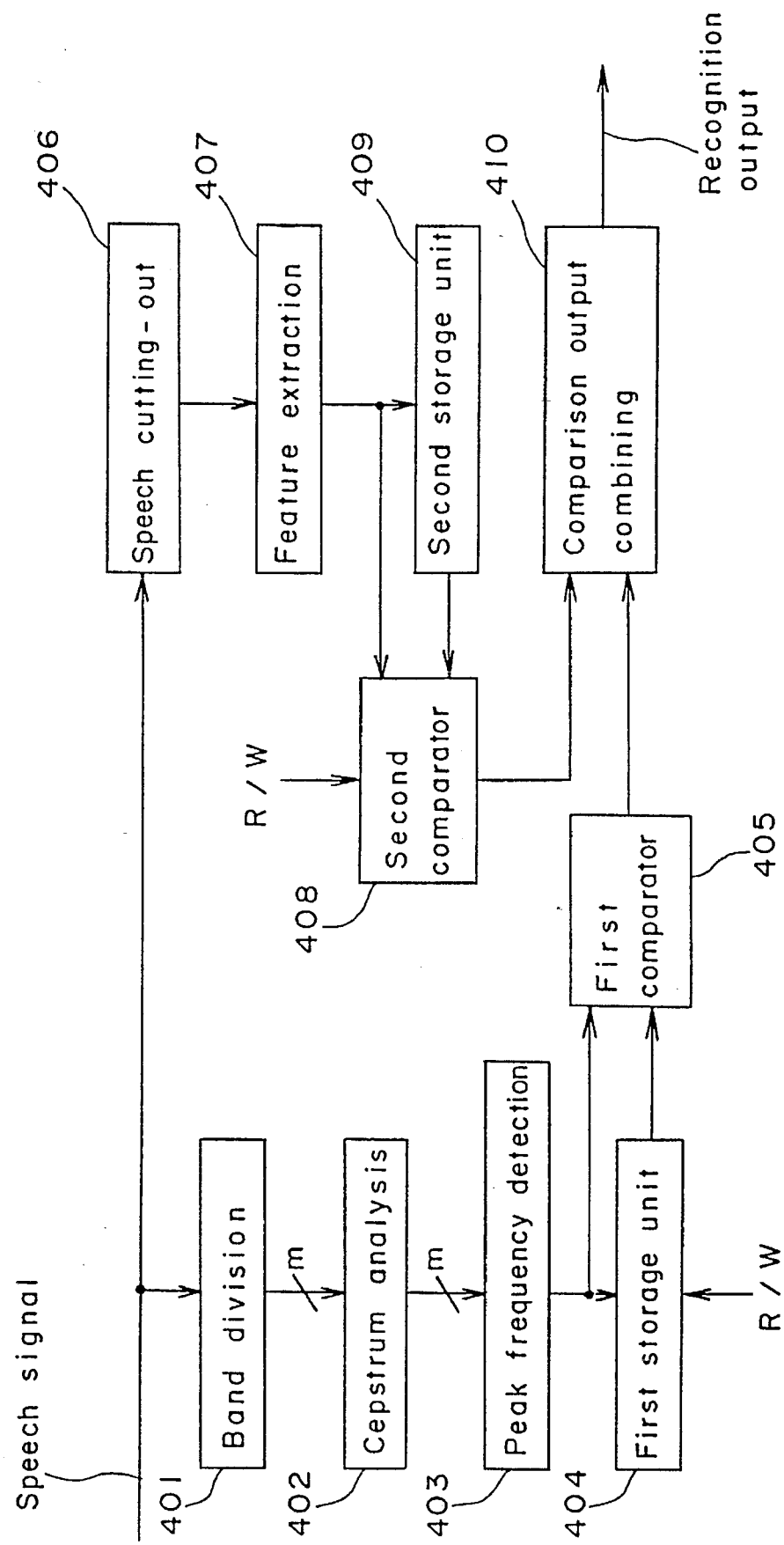
FIG. 18 is a schematic block diagram showing a speech recognition apparatus of a fourteenth preferred embodiment according to the present invention.

FIG. 18 shows a speech recognition apparatus of a fourteenth preferred embodiment according to the present invention.

The speech recognition apparatus comprises a band division section 401, a cepstrum analysis section 402, a peak frequency detection section 403, a first storage unit 404, a first comparator 405, a speech cutting-out section 406, a feature extraction section 407, a second comparator 408, a second storage unit 409 and a comparison output combining section 410.

Referring to FIG. 18, the band division section 401 performs a band division process including a Fourier transformation for an inputted speech signal, and outputs spectrum signals of plural m channels for which the band division process has been performed. For example, the band division section 401 comprises an analogue to digital converter, an FFT for Fourier-converting the A/D converted digital signal to a spectrum signal and a band divider for dividing the spectrum signal into band-divided spectrum signals of plural m channels.

The cepstrum analysis section 402 performs a cepstrum analysis for the spectrum signals of plural m channels inputted from the band division section 401, and outputs the cepstrum analysis result to the peak frequency detection section 403. The peak frequency detection section 403 detects a peak frequency from the cepstrum analysis result outputted from the cepstrum analysis section 402, and outputs the detected peak frequency to the first storage unit 404 and the first storage unit 405.

The first storage unit 404 previously stores peak frequencies of respective speakers which are previously obtained by performing the band division process, performing the cepstrum analysis for the band-divided spectrum signals and detecting a peak frequency from the cepstrum analysis result. The first storage unit 404 is constituted by, for example, a ROM etc.

The first comparator 404 compares the peak frequency outputted from the peak frequency detection section 403 with the peak frequencies of respective speakers which are stored in the first storage unit 404 and are read out therefrom, and detects which speaker an inputted speech signal corresponds to. When the detected peak frequency of the inputted speech signal is closest to a peak frequency stored in the first storage unit 404 within a permissible range, the first comparator 405 judges that the speaker of the closest peak frequency is a speaker of the inputted speech signal. The comparison result is outputted from the first comparator 405 to the comparison output combining section 410.

On the other hand, the second storage unit 409 previously stores speech features of respective speakers, and is constituted by a ROM etc.. For example, the second storage unit 409 stores the speech features of respective speakers by a word, by a syllable such as "a", "i", "u", or by a phoneme.

The speech cutting-out section 406 cuts out a speech from a noisy speech signal, and is constituted by a filter. The feature extraction section 407 extracts speech features from the cut-out speech and outputs the speech features to the second comparator 408 and the second storage unit 409.

The second comparator 408 recognizes a speech by comparing the speech features extracted by the feature extraction section 407 with the speech features stored in the second storage unit 409, and outputs the comparison result to the comparison output combining section 410. For example, a pattern matching method is used in the second comparator 408.

Based on the comparison result outputted from the first comparator 405 and the comparison result outputted from the second comparator 408, the comparison combining section 410 performs a predetermined process and outputs the processed result. For example, when a speech of a speaker which is different from the speakers previously specified is recognized, the recognition result is not outputted from the comparison output combining section 410. Alternatively, the recognition result is outputted together with the speaker information from the comparison output combining section 410.

An operation of the speech recognition apparatus of the fourteenth preferred embodiment will be described below in detail.

Peak frequencies of respective speakers obtained by previously performing the band division process for speech signals of known speakers and performing the cepstrum analysis are previously stored in the first storage unit 404. Speech features of respective speakers are previously stored in the second storage unit 409.

Thereafter, the band division section 401 performs the band division process including a Fourier transformation for an inputted unknown noisy speech signal, and then, the cepstrum analysis section 402 performs the cepstrum analysis for the output of the band division section 401. Thereafter, the peak frequency detection section 403 detects a peak frequency from the cepstrum analysis result outputted from the cepstrum analysis section 402, and the first comparator 405 compares the detected peak frequency outputted from the peak frequency detection section 403 with the peak frequencies of respective speakers stored in the first storage unit 404, and detects which speaker the inputted known speech signal corresponds to.

The speech cutting-out section 406 cuts out a speech from a noisy speech signal, and the feature extraction section 407 extracts speech features of the cut-out speech. Thereafter, the second comparator 408 recognizes a speech by comparing the speech features extracted by the feature extraction section 407 with the speech features stored in the second storage unit 409.

Thereafter, based on the comparison result of the first comparator 405 and the comparison result of the second comparator 408, the comparison output combining section 410 outputs the speech recognition result only when the speaker of the inputted speech signal is a predetermined speaker.

The Fifteenth Preferred Embodiment

Figure 19:
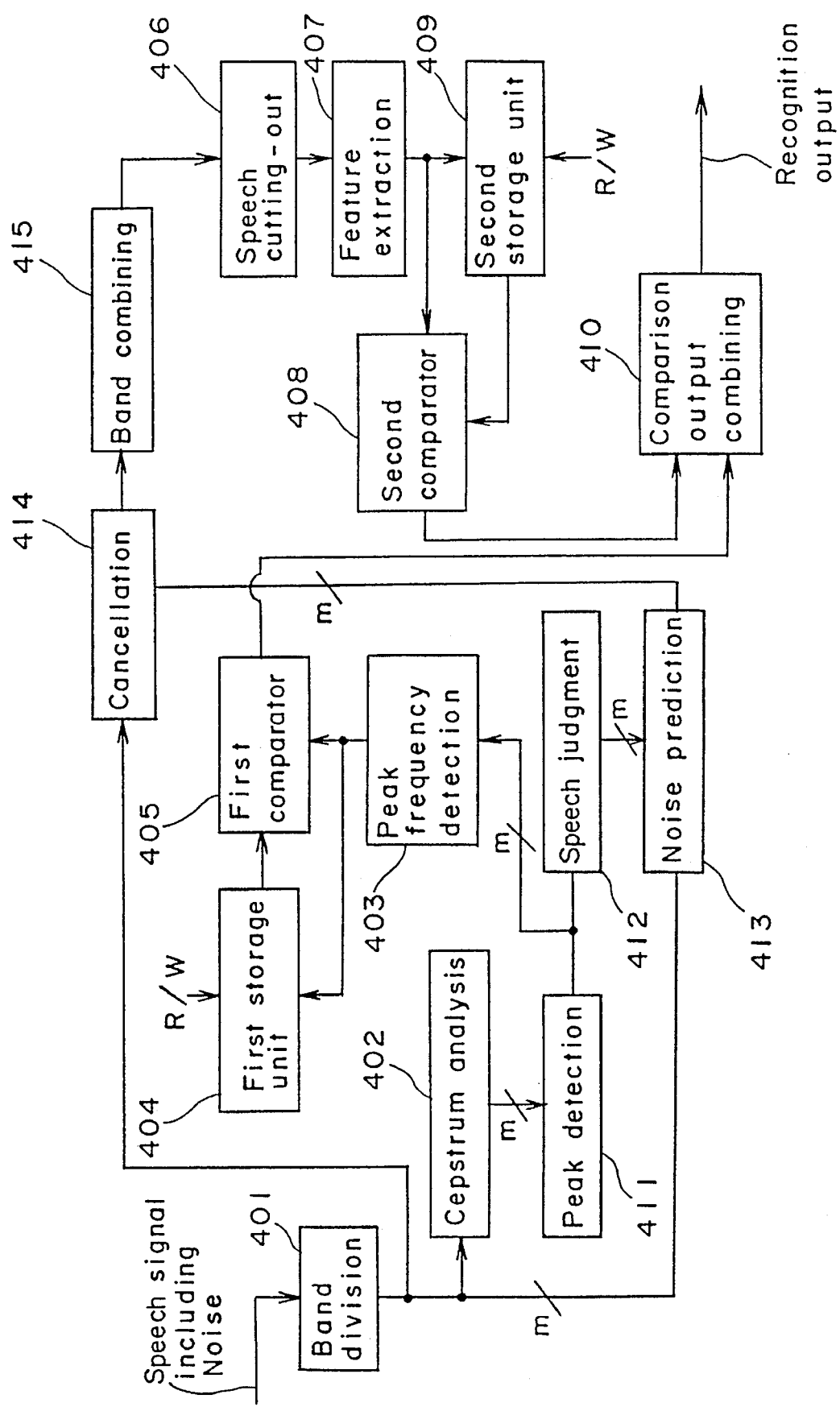
FIG. 19 is a schematic block diagram showing a speech recognition apparatus of a fifteenth preferred embodiment according to the present invention.

FIG. 19 shows a speech recognition apparatus of a fifteenth preferred embodiment according to the present invention. In FIG. 19, the same components as those shown in FIG. 18 are denoted by the same references as those shown in FIG. 18.

In the present preferred embodiment, the band division section 401, the cepstrum analysis section 402, the first storage unit 404, the first comparator 405, the speech cutting-out section 406, the feature extraction section 407, the second comparator 408, the second storage unit 409 and the comparison output combining section 410 are constituted in manners similar to those shown in FIG. 18, the description of these sections is omitted below.

A peak detection section 411, a peak frequency detection section 403, a speech judgment section 412, a noise prediction section 413 and a cancellation section 414 are constituted in manners similar to those of the peak detection section 209, the peak frequency detection section 203, the speech judgment section 210, the noise prediction section 211 and the cancellation section 212 which are used in the tenth preferred embodiment shown in FIG. 14.

In the present preferred embodiment, the cancellation section 414 outputs noise-suppressed spectrum signals of plural m channels in a manner of that of the cancellation section 212 shown in FIG. 14 by canceling a noise from the noisy spectrum signals. A band combining section 415 performs the band combining process including the inverse Fourier transformation for the spectrum signals of plural m channels outputted from the cancellation section 414, and outputs a transformed speech signal to the speech cutting-out section 406. The speech cutting-out section 406 cuts out a speech from the speech signal outputted from the band combining section 415.

In the present preferred embodiment, as described above, since a noise is canceled from a noisy speech signal for which the speech recognition process is performed, the speech recognition process can be performed having a recognition rate higher than that of the conventional speech recognition apparatus.

The Other Preferred Embodiments

In the above-mentioned preferred embodiments, the cepstrum analysis section, the maximum likelihood detection section, the noise interval judgment section, the peak frequency detection section, the noise prediction section, the speech detection section, the formant analysis section and the first and second comparators are constituted utilizing a computer by software. However, these sections can be constituted by dedicated hardware.

In the preferred embodiments, a speech signal may be handled as a noise. Namely, in the present invention, a noise means a signal other than a specified signal.

In the above-mentioned preferred embodiments, there is provided plural comb type band-pass filters. However, only one comb type band-pass filter may be provided, and then, may be controlled by a time division multiplex method.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A signal detecting apparatus for detecting a group of an inputted speech signal based on successive intervals of said inputted speech signal including a noise, comprising:

cepstrum analysis means for performing a cepstrum analysis for each successive interval of said inputted speech signal including said noise and for outputting a corresponding cepstrum analysis result indicative of a relationship between a cepstrum level and quefrency of each successive interval of said inputted speech signal;

storage means for previously storing information of respective relationships between a quefrency of a cepstrum peak of speech signals of predetermined plural groups and said plural groups;

signal judgment means for detecting whether each interval of said inputted speech signal is a speech signal interval containing speech based on the presence or absence of a cepstrum peak within each interval as indicated by the cepstrum analysis result outputted from said cepstrum analysis means;

maximum likelihood estimation means for detecting a group of said inputted speech signal by comparing a quefrency of a cepstrum peak present within each interval as indicated by said cepstrum analysis outputted from said cepstrum analysis means with said information of respective relationships stored in said storage means; and signal output means for outputting a pair of said speech signal intervals of said inputted speech signal detected by said signal judgment means and said group detected by said maximum likelihood estimation means.

2. The signal detection apparatus as claimed in claim 1, further comprising noise prediction means for predicting a future noise of said inputted noisy speech signal in response to said inputted noisy speech signal;

wherein said maximum likelihood estimation means detects a group of said inputted speech signal based on the noise predicted by said noise prediction means in addition to said cepstrum peaks outputted from said cepstrum analysis means and said information of respective relationships stored in said storage means.

* * * * *